(12) United States Patent
Hess et al.

(10) Patent No.: US 12,533,020 B2
(45) Date of Patent: Jan. 27, 2026

(54) SYSTEM AND METHOD FOR DIGITAL MEASUREMENT OF STEREO VISION

(71) Applicant: THE ROYAL INSTITUTION FOR THE ADVANCEMENT OF LEARNING/MCGILL UNIVERSITY, Montreal (CA)

(72) Inventors: Robert F. Hess, Montreal (CA); Alexander Baldwin, Vaudreuil-Dorian (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 955 days.

(21) Appl. No.: 17/423,184

(22) PCT Filed: Jan. 17, 2020

(86) PCT No.: PCT/CA2020/050051
§ 371 (c)(1),
(2) Date: Jul. 15, 2021

(87) PCT Pub. No.: WO2020/146952
PCT Pub. Date: Jul. 23, 2020

(65) Prior Publication Data
US 2022/0087523 A1   Mar. 24, 2022

Related U.S. Application Data

(60) Provisional application No. 62/793,632, filed on Jan. 17, 2019.

(51) Int. Cl.
*A61B 3/08*  (2006.01)
*A61B 3/00*  (2006.01)
*A61B 3/032* (2006.01)

(52) U.S. Cl.
CPC .............. *A61B 3/08* (2013.01); *A61B 3/0033* (2013.01); *A61B 3/0041* (2013.01); *A61B 3/032* (2013.01)

(58) Field of Classification Search
CPC .......... A61B 3/08; A61B 3/0041; A61B 3/032
(Continued)

(56) References Cited

U.S. PATENT DOCUMENTS 5,235,361 A * 8/1993 Super ...................... A61B 3/08
351/201
7,290,878 B1 * 11/2007 Hofeldt .................... A61B 3/08
351/200

(Continued)

FOREIGN PATENT DOCUMENTS

| JP | 4977895 B2 | 7/2012 |
| JP | 2014-64850 A | 4/2014 |

(Continued)

OTHER PUBLICATIONS

O'shea, R.P., Blake, R. Depth without disparity in random-dot stereograms. Perception & Psychophysics 42, 205-214 (1987). https://doi.org/10.3758/BF03203072 (Year: 1987).*

(Continued)

*Primary Examiner* — Zachary W Wilkes
(74) *Attorney, Agent, or Firm* — Perkins Coie LLP

(57) ABSTRACT

A system and method for stereo vision measurement are provided. A three-dimensional visual stimulus is generated. The visual stimulus is composed of a plurality of spatially filtered dot elements configured to isolate stereo function. The visual stimulus is then presented to a user via a display device and input data is received in response to the user viewing the visual stimulus as presented. A stereo performance of the user is then determined from the input data.

13 Claims, 14 Drawing Sheets

(58) Field of Classification Search
USPC .......................................................... 351/201
See application file for complete search history.

(56) References Cited

U.S. PATENT DOCUMENTS

| | | | |
|---|---|---|---|
| 9,788,714 | B2 | 10/2017 | Krueger |
| 10,123,693 | B2 * | 11/2018 | Bex .......................... A61B 3/08 |
| 2008/0278682 | A1 | 11/2008 | Huxlin et al. |
| 2010/0201942 | A1 | 8/2010 | Hess et al. |
| 2010/0283969 | A1 | 11/2010 | Cooperstock et al. |
| 2012/0140130 | A1 | 6/2012 | Yanai |
| 2014/0035902 | A1 | 2/2014 | An et al. |
| 2015/0150444 | A1 | 6/2015 | Bex et al. |
| 2015/0339570 | A1 | 11/2015 | Scheffler |
| 2016/0048021 | A1 | 2/2016 | Border |
| 2017/0065168 | A1 | 3/2017 | Bex |
| 2017/0293356 | A1 | 10/2017 | Khaderi et al. |
| 2017/0293365 | A1 | 10/2017 | Miura et al. |
| 2019/0362219 | A1 | 11/2019 | Scheffler |

FOREIGN PATENT DOCUMENTS

| | | |
|---|---|---|
| JP | 2018-532439 A | 11/2018 |
| KR | 10-1383797 B1 | 4/2014 |
| WO | 2017/015603 A1 | 1/2017 |

OTHER PUBLICATIONS

Sanger, T.D. Stereo disparity computation using Gabor filters. Biol. Cybern. 59, 405-418 (1988). https://doi.org/10.1007/BF00336114 (Year: 1988).*

Frederick A.A. Kingdom, David R. Simmons, Stéphane Rainville; On the apparent collapse of stereopsis in random-dot-stereograms at isoluminance; Vision Research, vol. 39, Issue 12, 1999, pp. 2127-2141, ISSN 0042-6989; https://doi.org/10.1016/S0042-6989(98)00257-0 (Year: 1999).*

Neri, P., Parker, A. & Blakemore, C. Probing the human stereoscopic system with reverse correlation. Nature 401, 695-698 (1999). https://doi.org/10.1038/44409 (Year: 1999).*

Faria Fda C, Batista J, Araújo H. Stereoscopic depth perception using a model based on the primary visual cortex. PLoS One. Dec. 5, 2013;8(12):e80745. doi: 10.1371/journal.pone.0080745. PMID: 24339881; PMCID: PMC3855160. (Year: 2013).*

Juliane Tittes, et al. Assessment of stereovision with digital testing in adults and children with normal and impaired binocularity, Vision Research, vol. 164, 2019, pp. 69-82 (Year: 2019).*

Ushakov D. N., "Explanatory Dictionary of the Modern Russian Language, "Adelant"", 2013, 6 pages (3 pages of English Translation and 3 pages of Official Copy).

Hibbard et al., "Magnitude, Precision, and Realism of Depth Perception in Stereoscopic Vision", Cognitive Research: Principles and Implications, Article No. 25, 2017, pp. 1-11.

Mita et al., "Psychophysical Threshold Estimates in Logistic Regression Using the Bootstrap Resampling", Kawasaki Journal of Medical Welfare, vol. 17, No. 2, 2012, pp. 58-69.

Mita et al., "Use of Statistical Analysis for Visual Acuity Measurement", Dept of Ophthalmol, Kanazawa Medical Univ, 2010, pp. 19-25 (Official Copy Only) (See Communication under 37 CFR § 1.98(a) (3)).

Mita et al., "Use of Statistical Analysis for Visual Acuity Measurement," Department of Ophthalmol, 2009, 7 pages.

* cited by examiner

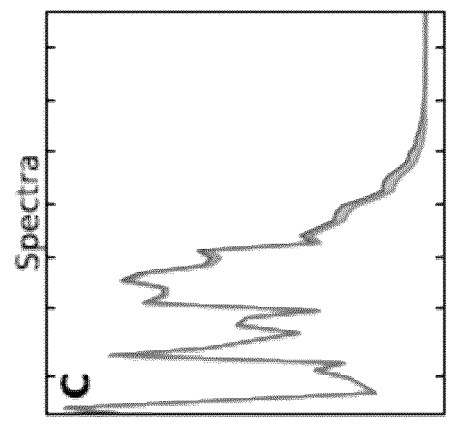
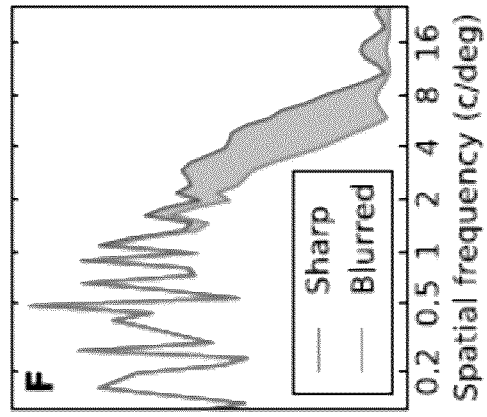
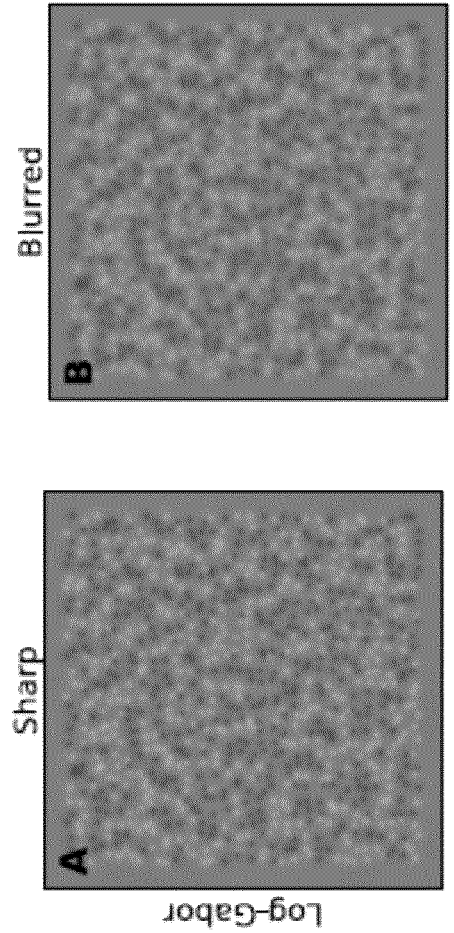
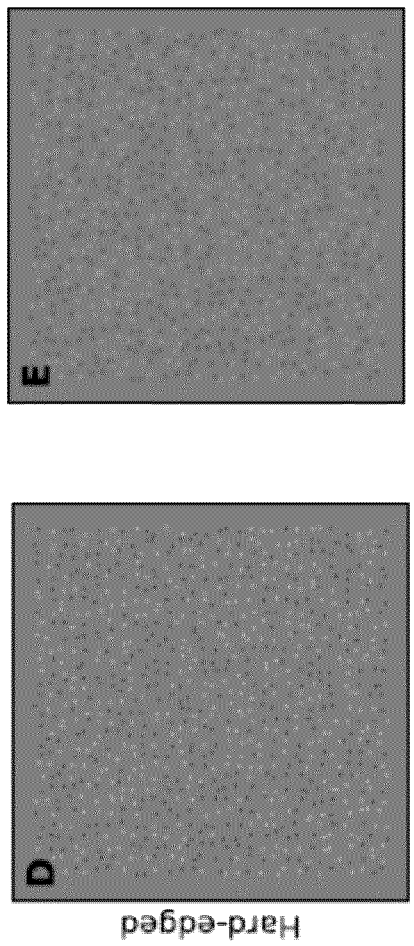
FIGURE 4A  FIGURE 4B  FIGURE 4C
FIGURE 4D  FIGURE 4E  FIGURE 4F Spatial domain Fourier domain "Ring" / "Circle"     "Square"     "Plus" / "Cross"
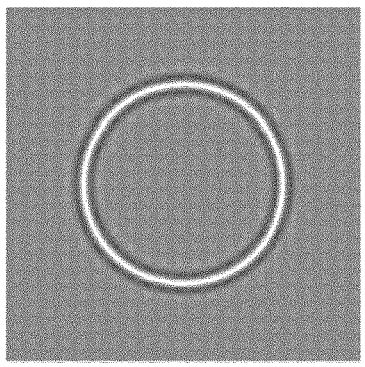 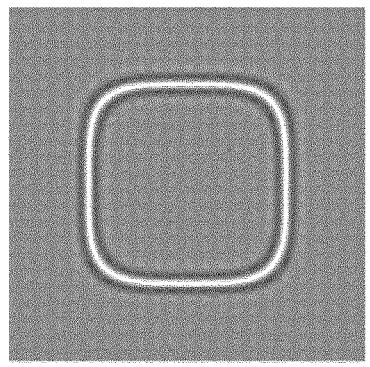 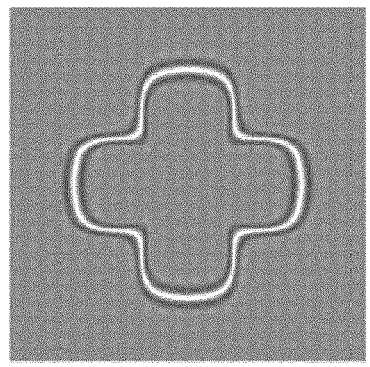
Figure 12A    Figure 12B    Figure 12C
Source shape    Bandpass filter    Filtered shape
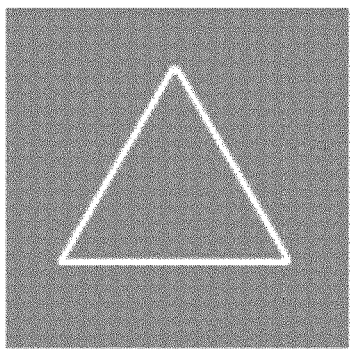 * 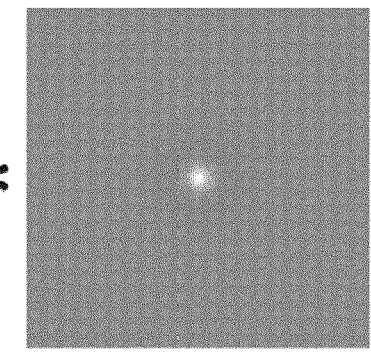 = 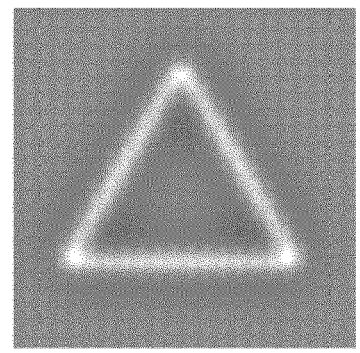
Figure 13A
Subsampled shape

SYSTEM AND METHOD FOR DIGITAL MEASUREMENT OF STEREO VISION

RELATED APPLICATIONS

This application is a U.S. National Stage patent application of PCT/CA20/050051, filed on Jan. 17, 2020, which claims priority to U.S. provisional patent application 62/793,632, filed on Jan. 17, 2019, entitled "SYSTEM AND METHOD FOR DIGITAL MEASUREMENT OF STEREO VISION," the contents of each of which are hereby incorporated by reference in their entirety for all purposes.

TECHNICAL FIELD

The present disclosure relates to the field of vision, and more particularly to stereo vision measurement.

BACKGROUND OF THE ART

In normal binocular vision, the brain makes use of the input from the two eyes together. The distance between the eyes means that the image projected onto one eye's retina is slightly different from that in the other eye. These differences depend on the relative distances between the observer and the features (e.g. objects) that form the retinal images. The brain is able to make use of the horizontal disparity between features seen in the two eyes in order to judge the distance to that feature. The ability to do so is often assessed as part of the suite of tests used to monitor the health of the visual system. Poor performance relative to some accepted standard may indicate: i) the retinal image captured in either one or both eyes is degraded, ii) there is a failure in the processing performed to combine the images from the two eyes, or iii) there is a failure in the extraction of the disparity information.

For some patients who suffer from disorders of binocular vision, the visual cortex suppresses a weaker eye's image in favor of that seen by the dominant eye. In the specific case of amblyopia, we refer to the amblyopic eye as that which is suppressed and the fellow eye as that which is dominant. The suppression of the amblyopic eye can continue even when that eye's optics are corrected (e.g. with corrective lenses) so as to have acceptable acuity. Thus, when one covers the fellow eye (for example, with an eye patch), the amblyopic eye's image can be used to perceive the world as well as through the fellow eye. However, once the patch is removed and both eyes are used for vision, the suppression typically returns. This results in a loss of stereo vision in addition to a loss of quality of vision.

The images used for a stereo vision test typically provide information that the subject needs to use in a response, and by measurement of the response, one can determine the subject's ability to perceive stereo. An example test image can be one in which a number of different objects are presented with different disparities, and then the subject is asked which one of the objects appears closest. For a subject with dysfunctional stereo vision, failure to perceive different depths can be frustrating, and there is temptation, whether conscious or unconscious, to determine an answer alternatively. Without careful design, non-stereo cues can be introduced into tests of stereovision that allow stereo-blind patients to achieve an acceptable level of performance. Introducing disparity into the stimulus requires that the features to be presented in depth must be moved in different directions in the images presented to the two eyes. This movement can result in changes in the local arrangement or density of features that indicate the region of the display where the manipulation was performed. For sharp-edged stimuli presented using red/green glasses, the very edges of features to which disparity is applied can appear colourful. Also, when an attempt is made to present sharp-edged stimuli at precise disparities (where their positions fall between two pixels), this can result in a "blurry" appearance that gives away the features that have been manipulated. As a final example: since the weak eye's image can be perceived by closing the fellow eye, the subject can effectively see the change in disparity in the objects in the image pair by blinking the fellow eye. This can allow a subject to know what answer to give, even if stereo vision was not responsible for the answer. A robust test of stereovision must minimise the performance of any patient who is not performing the task based on an impression of depth from stereoscopic disparity.

Further, traditional stereo vision tests may not be useful for patients who have low visual acuity in one or both eyes. This is especially an issue for amblyopic patients where the optics of the weaker eye may be corrected but the vision is still poor. The images presented in previous tests of stereovision may generally have hard edges. These hard edges are carried by fine detail (high spatial frequencies) which may not be perceived by a patient with low visual acuity. They will instead perceive them as blurry. The resulting loss of information from the stereo test stimulus places these subjects at a disadvantage compared to those with properly corrected acuity. This then causes a confound in the measurement. Thus, it may not be clear whether a relatively poor performance on the stereovision test is due to a problem with stereovision, or if it is simply a consequence of the subject having poor acuity in one or both eyes.

The presently-available techniques for testing stereo vision give no measure of the error associated with the measured sensitivity. Existing techniques also have a limited range of disparities that can be tested. The utility of these techniques for measuring stereo is therefore reduced, particularly in cases where stereo vision is impaired. Patients with relatively poor stereo may fall outside the testable range and be mistakenly labelled as "stereo-blind". Conversely, patients may have stereovision that is too good to be accurately measured by current tests. This will be the case if they are still able to perform the test even for the smallest disparity presented. In addition, due to their limited testing range and absence of any error measurement, existing techniques are prevented from being used as primary outcome measures in clinical trials where improvements in stereo vision are sought as an outcome of treatment. Furthermore, current techniques present subjects with stimuli from a book containing only a limited set of disparities. This prevents the precise measurement of stereo vision in subjects whose abilities fall between predetermined levels.

As a result, there is currently no stereo test available that precisely measures stereoacuity over a wide range of disparities with an associated error measurement. This is a particular issue for measuring subjects who have low stereoacuity and require large disparities to see depth and in conditions where a change in stereo acuity as a result of disease or treatment needs to be assessed. There is therefore room for improvement.

SUMMARY

In accordance with a first broad aspect, there is provided a system for stereo vision measurement. The system comprises a processing unit and a non-transitory memory communicatively coupled to the processing unit and comprising computer-readable program instructions executable by the processing unit for generating a three-dimensional visual stimulus, the visual stimulus composed of a plurality of spatially filtered dot elements configured to isolate stereo function, presenting, via a display device, the visual stimulus to a user, receiving input data in response to the user viewing the visual stimulus as presented, and determining a stereo performance of the user from the input data.

In accordance with a second broad aspect, there is provided a computer-implemented method for stereo vision measurement, the method comprising, at a computing device generating a three-dimensional visual stimulus, the visual stimulus composed of a plurality of spatially filtered dot elements configured to isolate stereo function, presenting, via a display device, the visual stimulus to a user, receiving input data in response to the user viewing the visual stimulus as presented, and determining a stereo performance of the user from the input data.

In accordance with a third broad aspect, there is provided a non-transitory computer readable medium having stored thereon program code executable by at least one processor for generating a three-dimensional visual stimulus, the visual stimulus composed of a plurality of spatially filtered dot elements configured to isolate stereo function, presenting, via a display device, the visual stimulus to a user, receiving input data in response to the user viewing the visual stimulus as presented, and determining a stereo performance of the user from the input data.

BRIEF DESCRIPTION OF THE DRAWINGS

Further features and advantages of the present invention will become apparent from the following detailed description, taken in combination with the appended drawings, in which:

FIGS. 4A-4F illustrates the effect of blur on the log-Gabor dots of FIGS. 3A-3B, compared to hard-edged dots of a similar size, in accordance with an illustrative embodiment;

FIGS. 12A-12C are bandpass shapes in accordance with the present disclosure;

FIGS. 13A-13B are diagrams illustrating the construction of spatially bandpass filtered

It will be noted that throughout the appended drawings, like features are identified by like reference numerals.

DETAILED DESCRIPTION

Herein described are systems and methods for digital measurement of stereo vision. Using the systems and methods described herein, measurements of stereoacuity may be used as an endpoint measure, thus allowing clinical trials where binocular function is the goal. The systems and methods described herein may also provide a measure of confidence on the stereoacuity threshold (an error measurement). Indeed, the systems and methods described may allow for a continuous large range of disparities to be tested. Visual stimuli may be generated at any disparity within the range of disparities, allowing for the precise measurement of stereo threshold.

The systems and methods described herein may therefore be used by healthcare professionals (e.g., in clinics by ophthalmologists and optometrists) to assess stereo vision in patients. The systems and methods described herein may also be used as a primary endpoint measure for outcomes in clinical trials that aim to treat anomalous binocular function. In addition, the systems and methods described herein may also be used for school screening (designed to detect the presence of a visual problem in one or both eyes that would impede stereo vision) and or occupational assessment for testing the ability to perform tasks that rely on visual performance (e.g. driving, flying).

Figure 1:
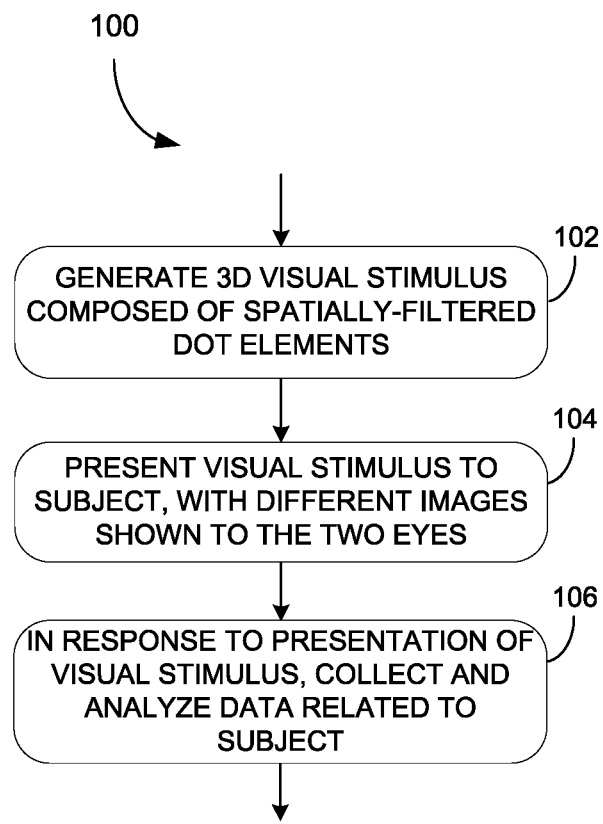
FIG. 1 is a flowchart of a method for digital measurement of stereo vision, in accordance with an illustrative embodiment.

Referring to FIG. 1, a method 100 for digital measurement of stereo vision, in accordance with one embodiment, will now be described. At step 102, a three-dimensional (3D) visual stimulus composed of spatially filtered dot elements is generated. The visual stimulus is then presented to a subject (also referred to herein as a user) at step 104 using a suitable 3D display device and/or system, with different images being shown to the two eyes of the subject. Data related to the subject is then collected and analyzed at step 106 to achieve stereo vision measurement for the subject.

Figure 2:
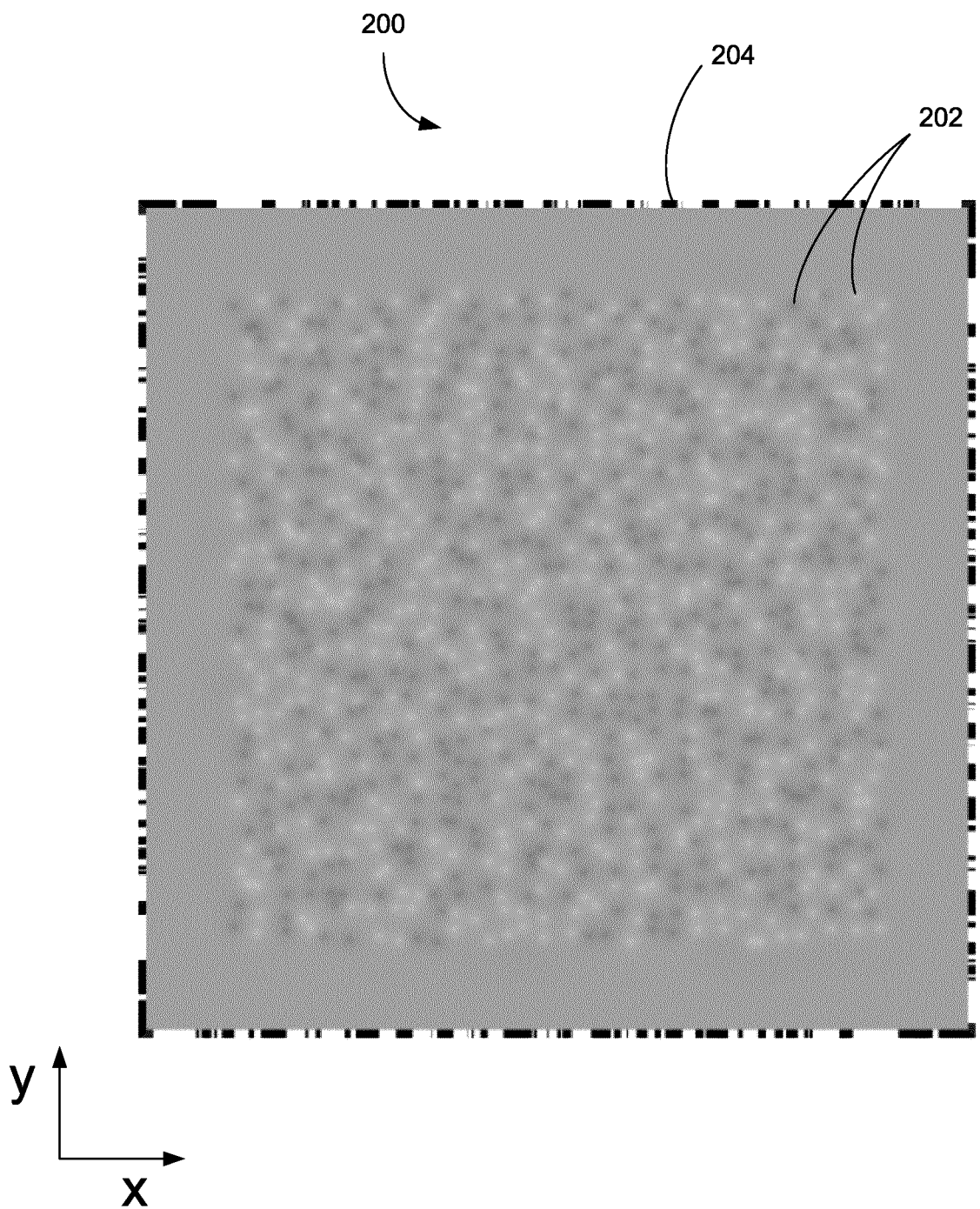
FIG. 2 is a schematic diagram illustrating a three-dimensional visual stimulus, in accordance with an illustrative embodiment.

As shown in FIG. 2, the stimulus 200 comprises a plurality of dots 202 that are spatially-bandpass circular wavelets resistant to the effects of blur. The arrangement of dots is presented within a "fusion lock" frame 204. The purpose of this frame is to encourage proper convergence of the eyes at the plane of the screen. The high-contrast patterned border should be readily fused between the two eyes. The frame 204 may be presented identically to both eyes. Accordingly, it may help the eyes to properly converge the images. The frame 204 is shown as a high-contrast patterned border, but it may take other forms, such as a solid border, a dashed border, a zig-zag border, or a curved border. Further, the frame 204 may be separated from the dots 202 by blank space. This space may prevent the patient from comparing features (such as the dots 202) against the frame 204 in order to more easily discover the disparity of the target. Otherwise, the patient may consciously or subconsciously compare either the disparity in the frame and the dots or compare the monocularly visible portions of features within the visual stimulus. The visual stimulus 200 is generated such that stereopsis ability of the patient is isolated. The stimulus is designed to minimise any other cues that the subject could use to perform a given stereo task. As used herein, the term stereo task refers to a stereo vision test in which the subject is presented with and prompted to respond to the stimulus 200, as will be discussed further below.

In particular, the stimulus 200 is generated at step 102 by tiling the dots 202 in a square grid with a defined mean spacing (not shown) between the dots 202. Each dot 202 is randomly assigned to be either a black or white dot before it is positioned on the grid. The x and y coordinates controlling the placement of each dot 202 are jittered by random samples from a uniform distribution, thereby placing the dots 202 within a dot displacement range of a given original position. This allows to break up the impression of a regular grid structure. By ensuring that the displacement range is less than half of the dot-to-dot spacing, it becomes possible to prevent adjacent dots 202 from overlapping, at least before disparity is introduced.

One skilled in the art will recognize that although FIG. 2 illustrates a mixture of dots with containing those with both a "black" and a "white" appearance, a stimulus 200 in accordance with the present disclosure may include only one shade of dot in some embodiments. The dots 202 may be colored such that viewing them through colored glasses (for example red/green glasses) affects their appearance. A stereoscopic presentation may be achieved by presenting the left and right eye images using different colours (anaglyph). Placing coloured filters in front of each eye may then allow only the appropriate image to be seen by each eye. In some embodiments, the color of the dots 202 may not be readily apparent when they are viewed with the naked eye.

Figure 9A:
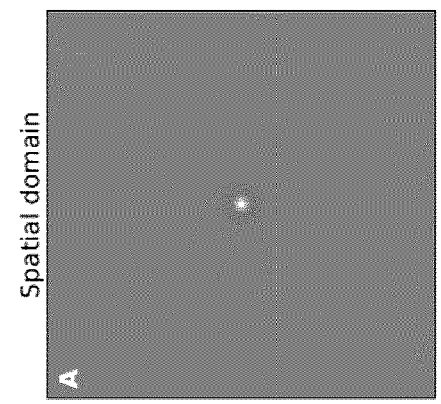
FIGS. 9A-9C are Difference of Gaussians dots in accordance with the present disclosure.
Figure 9B:
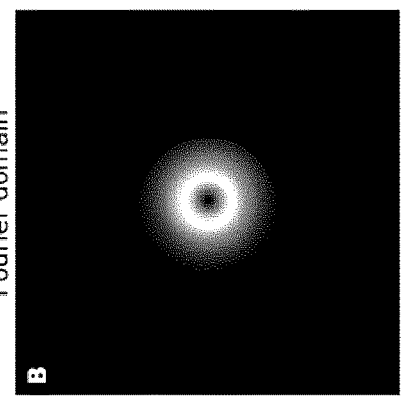
Figure 9C:
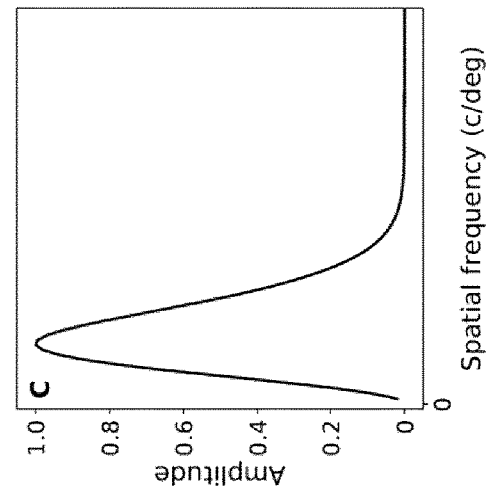
Figure 10:
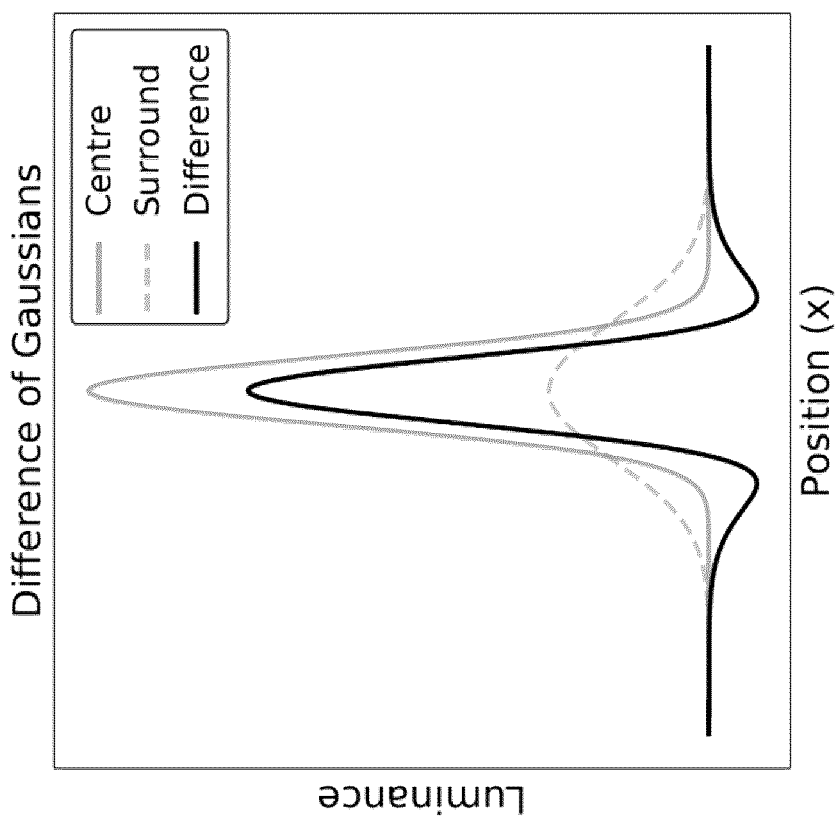
FIG. 10 is a schematic diagram of the construction of a Difference of Gaussians in accordance with the present disclosure.
Figure 11B:
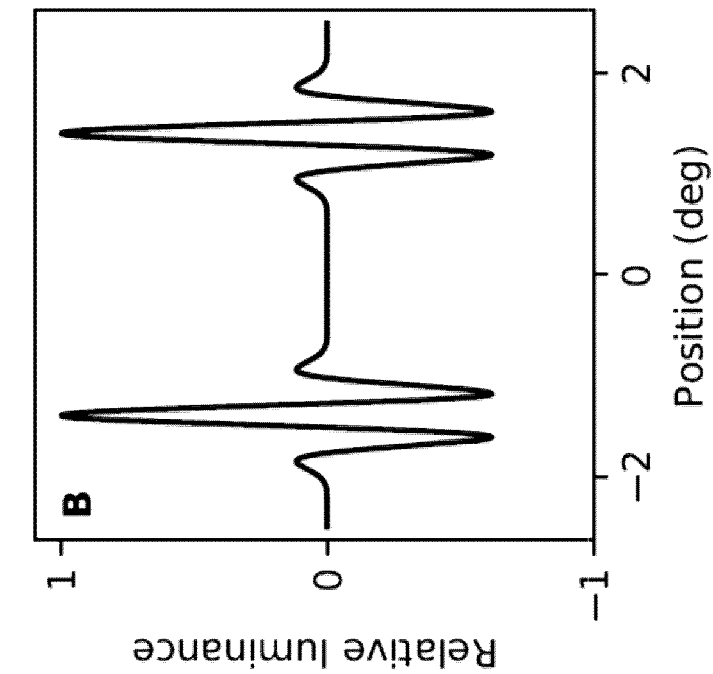
FIGS. 11A-11B are bandpass rings in accordance with the present disclosure.
Figure 11A:
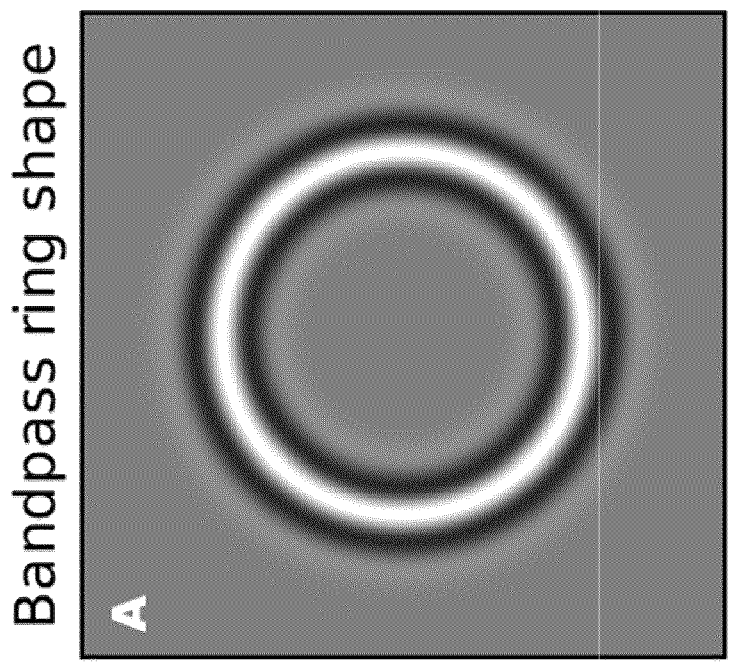

As discussed above, the visual stimulus may be composed of spatially filtered dot elements. In general, a spatially filtered dot element may be any element composed of one or more dots generated using a spatial filter. A spatially filtered dot element may comprise a modulation of pixels having a center and one or more edges. The bandpass amplitude spectrum may result in a blurry appearance to the different regions in the dot. The spatially filtered element may be configured such that its center can be located at a position between the pixels of a display device on which it is displayed. One skilled in the art will recognize that spatially filtered elements may take a variety of forms; several exemplary forms are discussed below: FIGS. 3A-3B and 8A-8C illustrate log-Gabor dots, FIGS. 9A-9C and 10 illustrate Difference of Gaussians (DoG dots), FIGS. 11A-11C illustrate ring dots, and FIGS. 12A-12C and 13 illustrate arbitrarily shaped spatially filtered dot elements. However, any type of spatially filtered element may be used without departing from the scope of the present disclosure.

Figure 3A:
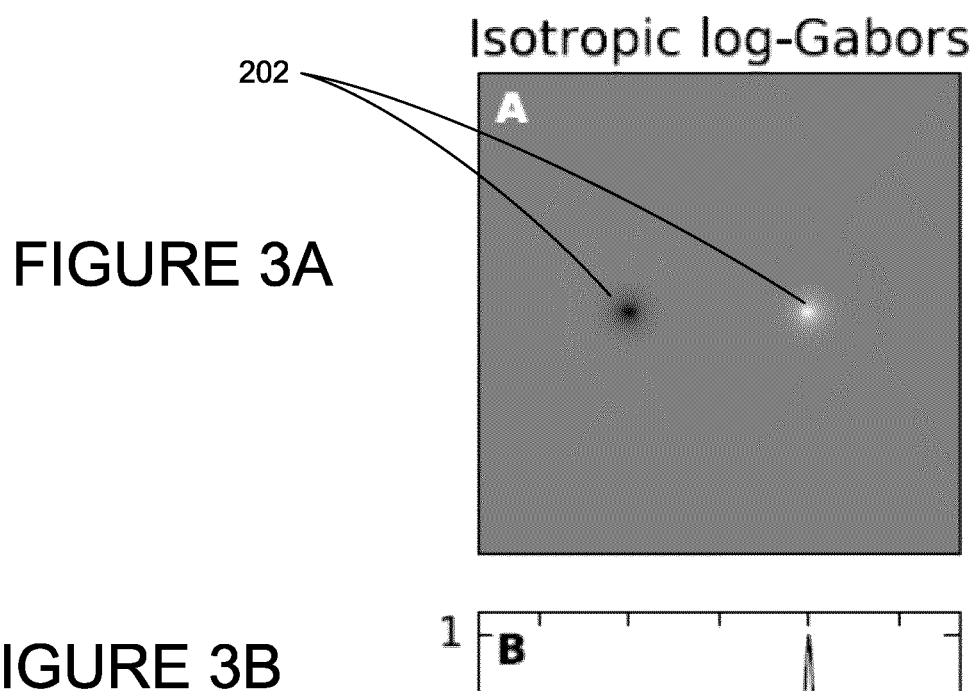
FIGS. 3A-3B illustrates example isotropic log-Gabor dots and the corresponding luminance profile of a horizontal cross-section through that image, in accordance with an illustrative embodiment.
Figure 3B:
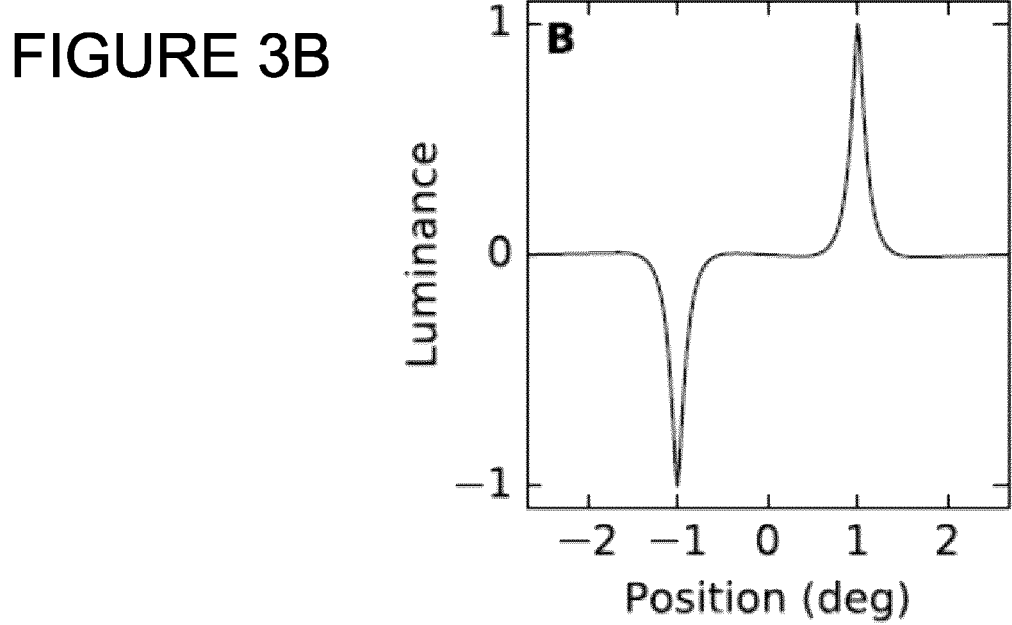

In one embodiment, the dots 202 are isotropic log-Gabor dots defined in the Fourier-domain to have equal energy at each orientation and a bandpass spatial frequency spectrum, as shown in FIGS. 3A-3B. The spatial frequency spectrum is Gaussian on a log-frequency axis. Compared to using hard-edged square or circular dots, using log-Gabor dots has some advantages. First, stimuli with step-edge luminance boundaries are vulnerable to any blur introduced by the visual system of subjects with sub-standard visual acuity. This is demonstrated in FIGS. 4A-4F where the top row shows the proposed stimulus (FIG. 4A) composed of bandpass log-Gabor dots and the bottom row shows an equivalent stimulus (FIG. 4D) composed of hard-edged circular dots. The second column (FIGS. 4B and 4E) shows the effect of blurring the stimuli presented in the first column. The third column shows how the blurring affects the amplitude spectra (FIGS. 4C and 4F) of the stimuli. From the spectra, it can be seen that the log-Gabor stimuli are more resistant to the effects of blur. A pilot test with the bandpass log-Gabor dots disclosed herein has further shown that stereo thresholds were unaffected by removing all spatial frequency information above 4 c/deg.

Figure 8A:
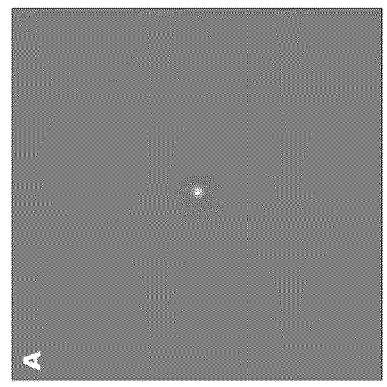
FIGS. 8A-8C are isotropic log-Gabor dots in accordance with the present disclosure.
Figure 8B:
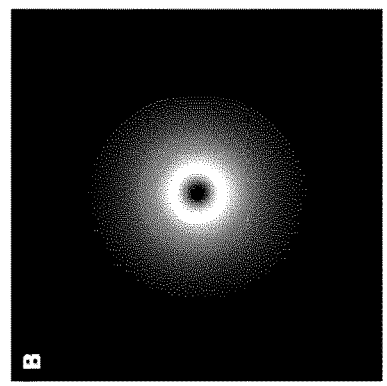
Figure 8C:
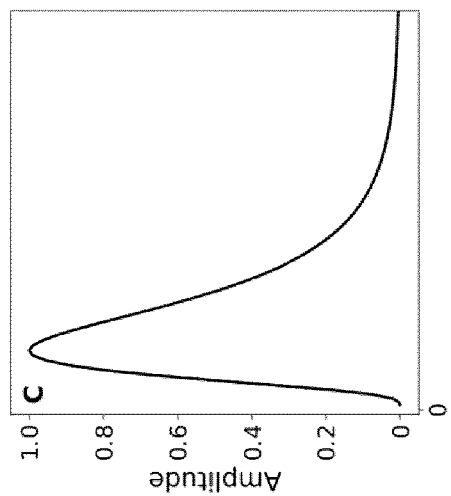

FIGS. 3A-3B illustrate pairs of log-Gabor dots. FIGS. 8A-8C illustrate single log-Gabor dots. The dots may be spatially band-pass, which refers to the spatial frequencies, or the variation in luminance over space, present in the dots.

FIG. 3A illustrates two log-Gabor dots in the spatial domain. A left dot may have a negative peak to a lower luminance and appear black in its center and a right dot may have a positive peak to a higher luminance and appear white in its center. These dots may specifically be isotropic log-Gabor dots defined in the Fourier-domain to have equal energy at each orientation and a bandpass spatial frequency spectrum.

FIG. 3B illustrates the same dots in the frequency domain. A Fourier transform may be used to convert the dots between the spatial domain and the frequency domain. The bandpass spatial frequency spectrum may be obviously seen in FIG. 3B. A high-pass filter may remove lower frequencies, a low-pass filter may remove higher frequencies, and a band-pass filter may include both a high-pass filter and a low-pass filter. As can be seen in FIG. 3B, a bandpass filter may be applied in this case. Luminance above 1 and below −1 may be filtered out. One skilled in the art will recognize that a bandpass filter using different high and low values may also be used without departing from the scope of the present disclosure.

In the spatial domain, a low-pass filtered image may appear blurred and a high-pass filtered image may include only smaller details such as edges. A band-pass filtered image may combine both of these effects. These effects can be seen in FIG. 8C where the amplitude spectrum of the log-Gabor has a peak, with the amplitude falling off at both higher and lower frequencies than that peak.

In other words, the dots are spatially filtered because some control has been exerted over the contribution of different spatial frequencies to their make-up. In the specific case of spatially bandpass, there is a specific range of spatial frequencies which form the dot. The dots may further be log-Gabor dots. This has a specific meaning for the shape of the amplitude spectrum, or the amplitude at each spatial frequency. A log-transform may be performed on the frequency axis and the amplitude spectrum may be defined as a Gaussian on that log-frequency axis.

FIGS. 8A-8C illustrate a single log-Gabor dot, in the spatial domain, the Fourier domain, and as an amplitude spectrum, taken as a radial slice from the center to the edge of FIG. 8B, respectively. The spatial domain shown in FIG. 8A may be what is visible in a visual stimulus constructed using the log-Gabor dot.

A log-Gabor dot may be constructed in the Fourier domain, as shown in FIG. 8B. The value at each point in the Fourier transform shown therein may indicate the contribution of the spatial frequency (f) and the orientation (e) to the image. The Fourier transform (F) may be represented by the following equation.

$$F(f, \theta) = \exp\left(-\frac{[\log(f) - \log(f_0)]^2}{2 \times \log(b)^2}\right) \tag{1}$$

In equation (1), $f_0$ may be the peak spatial frequency and b may control the bandwidth. Conversion from the Fourier domain shown in FIG. 8B to the spatial domain shown in FIG. 8A may give a log-Gabor dot element that can then be used to construct visual stimuli.

It should be noted from Equation (1) that the amplitude must be infinitesimally small when f=0. For practical purposes, the amplitude may be considered zero. This is important, as it means that for the log-Gabor dot, there should never be an overall change in screen luminance as a result of adding a dot to the display. The areas of increased luminance will be balanced out by areas of decreased luminance. This may have particular advantages for visual displays. It means that no matter the arrangement of spatially bandpass dots on the screen, the overall luminance will not be affected. For example, the shifting of the dot positions to create the disparity in the images may cause local increases or decreases in the density of the dots. If the dots changed the local luminance of the stimulus then these density changes would also cause there to be regions of the stimulus that were significantly brighter or darker than the rest. That may provide a non-stereo cue that would allow the patient to locate regions in the display where the disparity is being manipulated.

In addition to the log-Gabor dots discussed above, other spatially filtered dots may be used to construct visual stimuli. In fact, the log-Gabor dots may be only one of a vast number of options for spatially filtered dots. There may be particular interest in developing the visual stimuli used herein with control exerted over their amplitude spectrum. This may allow developers to design visual stimuli with desired characteristics. For example, high spatial frequency information, which may not be useful to patients with poor acuity, may be removed. It may be possible to develop such stimuli in the Fourier domain or in the spatial domain.

Another example of spatially filtered dots may be Difference of Gaussians (DoG) dots. FIGS. 9A-9C illustrate a DoG dot, in the spatial domain, the Fourier domain, and as an amplitude spectrum, taken as a radial slice from the center to the edge of FIG. 9B, respectively. As can be seen in FIG. 9B, the DoG element may include a center portion and a surround portion.

The DoG is a popular function which has a history of use for performing spatial filtering on images. As with the log-Gabors presented above, DoG elements may be used to directly replace dots in visual stimuli. Alternatively, stimuli can be generated with dots, which may approximate delta functions, and then those dots can be filtered with a DoG function.

A DoG element may be created by subtracting one Gaussian from another Gaussian. The two Gaussians may have the same mean, but a different standard deviation. FIG. 10 illustrates a Difference of Gaussian (solid line) created by subtracting a surround Gaussian (dashed line) from a center Gaussian (grey line).

The radial distance of each pixel from the center of the dot to be generated may be given by Equation (2) below. The center of the dot may be set at $r_{x,y}=0$.

$$r_{x,y} = \sqrt{x^2 - y^2} \quad (2)$$

The center Gaussian may be defined by Equation (3) and the surround Gaussian may be defined by Equation (4), below.

$$g_{centre}(r_{x,y}, \sigma_{centre}) = \exp\left(-\frac{r_{x,y}^2}{2 \times \sigma_{centre}^2}\right) \quad (3)$$

$$g_{surround}(r_{x,y}, \sigma_{surround}) = \exp\left(-\frac{r_{x,y}^2}{2 \times \sigma_{surround}^2}\right) \quad (4)$$

$\sigma_{surround}$ may be greater than $\delta_{center}$ and the two sigmas may control the shape of the DoG. The DoG may be created by taking the difference of the center Gaussian and the surround Gaussian using Equation (5).

$$d(x,y) = g_{centre}(r_{x,y}, \alpha_{centre}) - a \times g_{surround}(r_{x,y}, \sigma_{surround}). \quad (5)$$

In Equation (5), a may control the relative contribution of the surround Gaussian. The value of a may be set to result in a DoG which has no global change in luminance by choosing a value which results in minimal amplitude at f=0. This is illustrated in FIGS. 9A-9C. Accordingly, it may be possible to achieve a similar amplitude spectrum (see FIG. 9C) with DoG dots, as with log-Gabor dots.

Figure 13B:
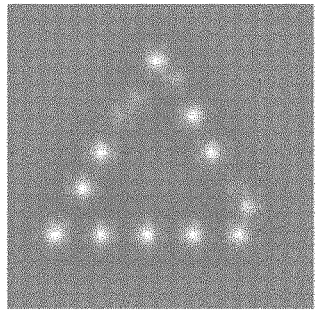

Although the previous examples show only isolated spatially filtered dots in a grid arrangement, it should be understood that these dots can also be arranged into other forms. They may then be used to create spatially bandpass shapes as shown in FIGS. 13A-13B. The spatially bandpass shapes may be considered spatially filtered dot elements. It is mathematically equivalent to either i) arrange the spatially filtered dots to form a specific shape (FIG. 13B), or ii) begin with a sharp line image of the desired shape and then convolve that image with a single spatially filtered dot (FIG. 13A). A further method to generate spatially-bandpass shapes is to mathematically define shape outlines and then render those outlines such that their cross-section has a specific form. Two possible forms for those cross-sections would make use of the log-Gabor cross section shown in FIG. 8B or the DOG cross-section shown in FIG. 9B. Other functions described below may also be used.

Stimulus elements having spatially bandpass shapes in accordance with the present disclosure may created by adapting the fourth order derivative of the Gaussian function. The spatial frequency of such functions may be set by a, as given by Equation (6) below.

$$\sigma = \frac{\sqrt{2}}{\pi \times f_0} \quad (6)$$

In Equation (6), $f_0$ may control the peak spatial frequency of the amplitude spectrum. $D_{sq}$, the squared distance across the cross-section, relative to its center xo, for each position x may then be defined by Equation (7).

$$D_{sq}(x, \sigma) = \frac{(x - x_0)^2}{\sigma^2} \quad (7)$$

$D_{sq}$, the squared distance may be used to define the luminance at each position in the cross-section C. C may be defined by Equation (8).

$$C(x, \sigma) = [4 \times D_{sq}(x, \sigma)^2 - 12 \times D_{sq}(x, \sigma) + 3] \times \frac{\exp[-D_{sq}(x, \sigma)]}{3} \quad (8)$$

FIGS. 11A-11D illustrate an example of a spatially filtered dot element having a ring shape made using a cross-section defined by Equation 8. FIG. 11A shows the ring dot in the spatial domain. This is what would be visible in a stimulus made using such ring dots. The ring dot has the appearance of two narrow dark rings sandwiching a wider bright ring. This can also be seen in FIG. 11C, which gives a horizontal cross-section taken through the centre of FIG. 11A. The positive luminance deviation of the central bright ring is balanced out by the negative deviation of the adjacent dark rings. This results in there being no overall offset in luminance when this stimulus is added to the display. The transitions between the bright and dark regions appear smooth, as there are no higher spatial frequencies present to give the impression of sharp edges.

FIG. 11B shows the Fourier transform of FIG. 11A. Similar to the spatially filtered dots, the stimulus energy is located in a circular band around the origin. The amplitude spectrum is presented in FIG. 11D. It has a similar bandpass form to that shown previously for the log-Gabor and Difference of Gaussians stimuli. Accordingly, the ring dot may provide the same advantages as the other dots described above.

In some embodiments, the ring dot may be generated by taking the coordinate of each pixel relative to the center of the ring dot. In some embodiments, the coordinates of each pixel may be given in Cartesian coordinates, and the center of the ring dot may be (0,0). Using these coordinates, a radial distance from the center of the dot may be calculated for each pixel using equation (9) and the luminance at each radial position may be related to the luminance at the corresponding Cartesian position by equation (10).

$$r_{x,y} = \sqrt{x^2 + y^2}, \qquad (9)$$

$$R(x,y,r_0,\sigma) = C(r_{x,y} - r_0, \sigma) \qquad (10)$$

The method described above for creating ring dots may be extended to generate arbitrarily shaped dot elements. For example, FIGS. 12A-12C illustrate a ring dot, an annular square element, and an annular cross element. The outlines of the annular dots may or may not be defined mathematically, for example as a Fourier-like series of radial frequency pattern components.

The annular square shown in FIG. 12B may be created in the same way as the ring function outlined above using equations (9) and (10). The radius equation may be modified slightly from what is given in equation (9) and equation (11) below may be used instead.

$$r'_{x,y} = \sqrt[4]{x^4 - y^4}. \qquad (11)$$

The annular cross shown in FIG. 12C is an example of what can be achieved with radial frequency pattern components. Because its radius at a given pixel depends on that pixel's angular position around the center of the image, the angle must be computed from the Cartesian x and y coordinates as shown below in equation (12).

$$\theta_{x,y} = a\tan 2(y,x) \qquad (12)$$

Thus, the shape is defined, similar to the ring in equation (10), by its radius. However, the radius is determined for each value of $\theta_{x,y}$ in the image. The annular cross is generated by equation (13) below.

$$R = 1.4 + 0.6 \times \sin(3 \times \theta_{x,y}) + 0.2 \times \sin(9 \times \theta_{x,y}) - 0.12 \times \sin(15 \times \theta_{x,y}) \qquad (13)$$

One skilled in the art will recognize that it is possible to generate a variety of shapes from sinusoidal components following these examples.

Even for shapes that cannot be represented using a sum of annular components, as demonstrated in Equation (13), it is possible to produce a spatially filtered element. FIG. 13A illustrates how such a dot may be generated. The desired outline may be produced; in this example, the outline is a triangle. The outline may serve as a source image. The outline may then be filtered with a spatially-bandpass filter kernel. The log-Gabor or DoG functions described above may be used as the filter kernel. The convolution of the source image with the filter kernel may result in a spatially-bandpass annular shape having the given outline. One skilled in the art will recognize that a wide variety of dots may be produced in this manner. In some embodiments, dots may be designed for particular functions.

Any of the types of dot elements discussed above may be used to produce a visual stimulus 200 as shown, for example, in FIG. 2. Visual stimuli in accordance with the present disclosure will be discussed in more detail below.

In some embodiments, a visual stimulus 200 may be created by first rendering an image filled with placeholder dots. The placeholder dots may approximate delta functions. The image may then be convolved with one of the functions described above, for example with a log-Gabor function. The convolution may replace every placeholder dot with a spatially filtered dot element 202 at its location. This method may be particularly efficient. Alternatively, a plurality of spatially filtered dot elements 202 may first be rendered and may then be placed in random locations. These steps may produce a visual stimulus 200 with randomly placed spatially filtered dot elements 202.

It may then be necessary to create the impression of disparity between what is presented to the left eye and what is presented to the right eye when the visual stimulus 200 is viewed. The visual stimulus 200 may be modified using the following steps to produce such an impression.

To give the impression of disparity, the final x coordinates of the dots 202 in the grid 204 may be further adjusted according to the desired disparity (or depth) of the dots 202 relative to the surface of the screen on which the stimuli is presented, also referred to herein as the fixation plane. Shifting left and right eye dots inwards (i.e. moving the left eye dot to the right and the right eye dot to the left) gives the impression of crossed disparity (i.e. of a dot being closer than the fixation plane). Shifting the dots 202 outwards gives the impression of uncrossed disparity (i.e. of a dot being further away than the fixation plane). FIG. 5A illustrates the design of four potential target regions in stimulus and shows that the disparities of the dots 202 may be manipulated within the bounds of a wedge shape. This gives the impression of a floating wedge. A task assigned to a patient viewing the visual stimulus may comprise identifying where in the stimulus a wedge appears at a different depth than the rest of the stimulus. The task may be made easier by making the disparity larger and so the difference in depths greater, and harder by making the difference in depths smaller.

One skilled in the art will recognize that FIG. 5A merely illustrates an exemplary embodiment of a control pattern for dot disparity. The dots 202 in the grid 204 may be shifted to produce any shape known in the art, as discussed above with respect to the wedges 502 shown in FIG. 5A.

Figure 5B:
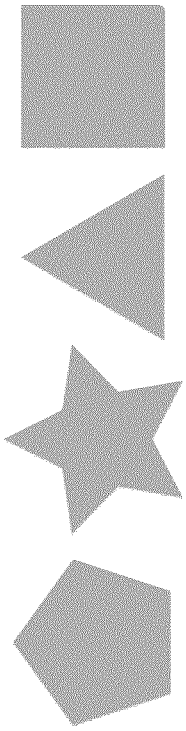
FIGS. 5A-5D illustrate proposed designs for potential target regions in stimulus, in accordance with illustrative embodiments.
Figure 5C:
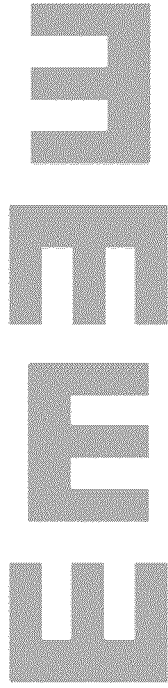
Figure 5D:
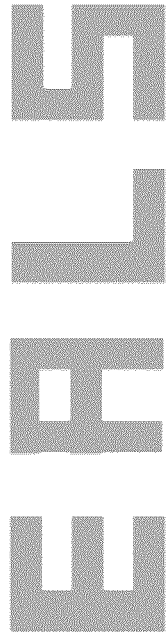
Figure 5A:
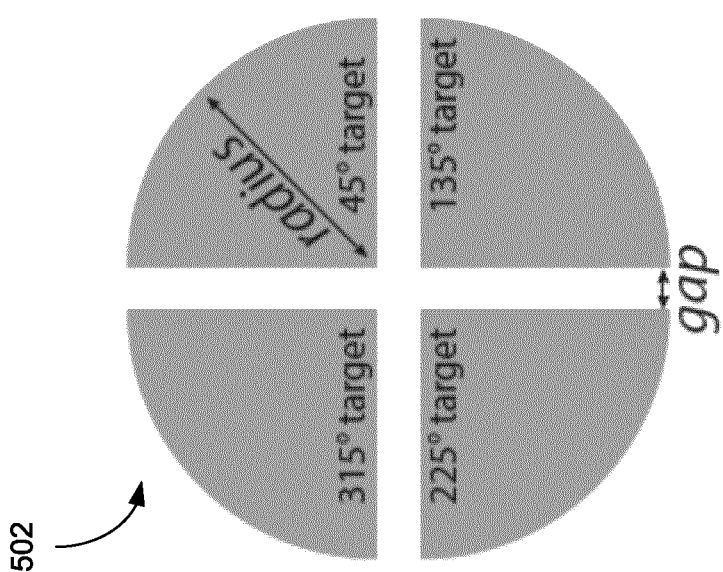

FIGS. 5B-5D illustrate other embodiments of target regions. FIG. 5B illustrates four symbols: a pentagon, a star, a triangle, and a square. In some embodiments a target region may be given the shape of one of these symbols or any other symbol known in the art. A patient may be asked to identify the symbol, provide a location of the symbol, or to determine whether the symbol appears to be floating in front of or behind the rest of the visual stimulus. FIG. 5C illustrates the letter E in four different orientations. In some embodiments the target region may be given the shape of a letter or other symbol whose orientation can be clearly recognized. A patient may be asked to identify a location and/or orientation of the symbol or to determine whether the symbol appears to be floating in front of or behind the rest of the visual stimulus. FIG. 5D illustrates four different letters. In some embodiments, the target region may be given the shape of a letter or number and a patient may be asked to identify and/or locate the letter or number or to determine whether it appears to be floating in front of or behind the rest of the visual stimulus.

Figure 15B:
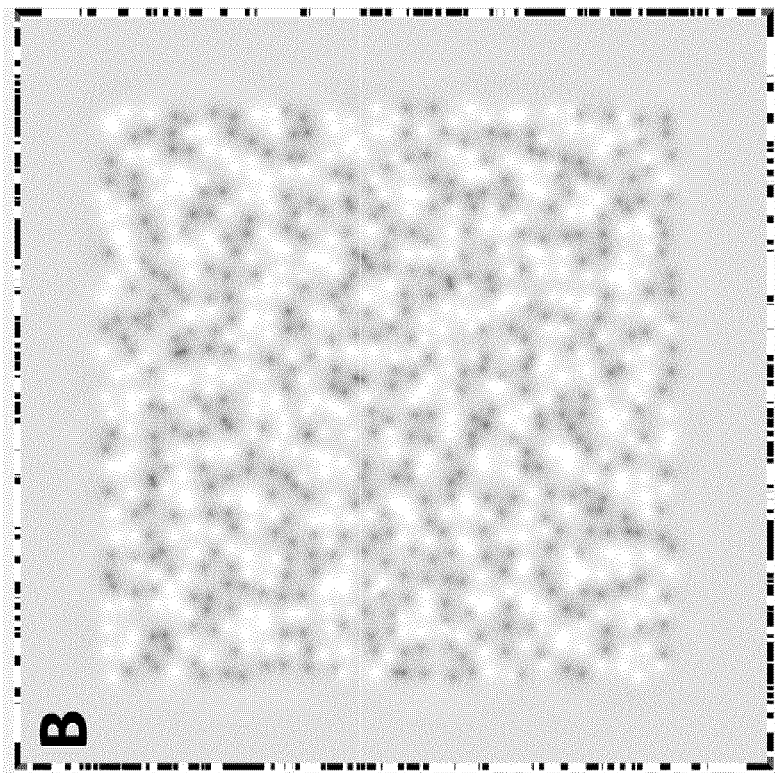
FIGS. 15A-15D illustrate a visual stimulus in accordance with the present disclosure.
Figure 15A:
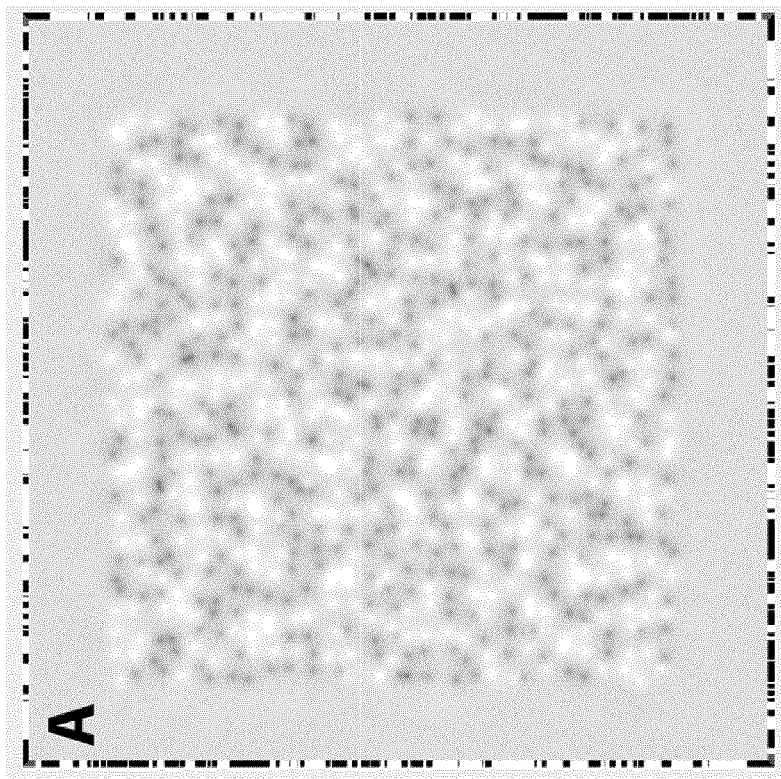
Figure 15D:
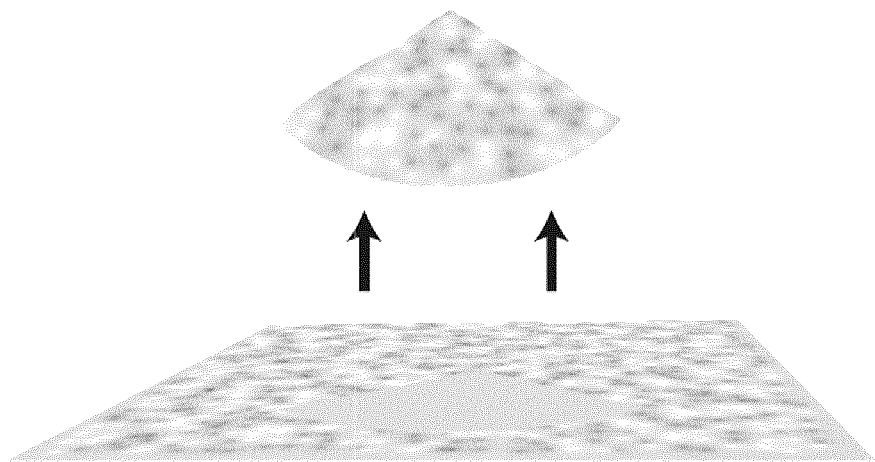
Figure 15C:
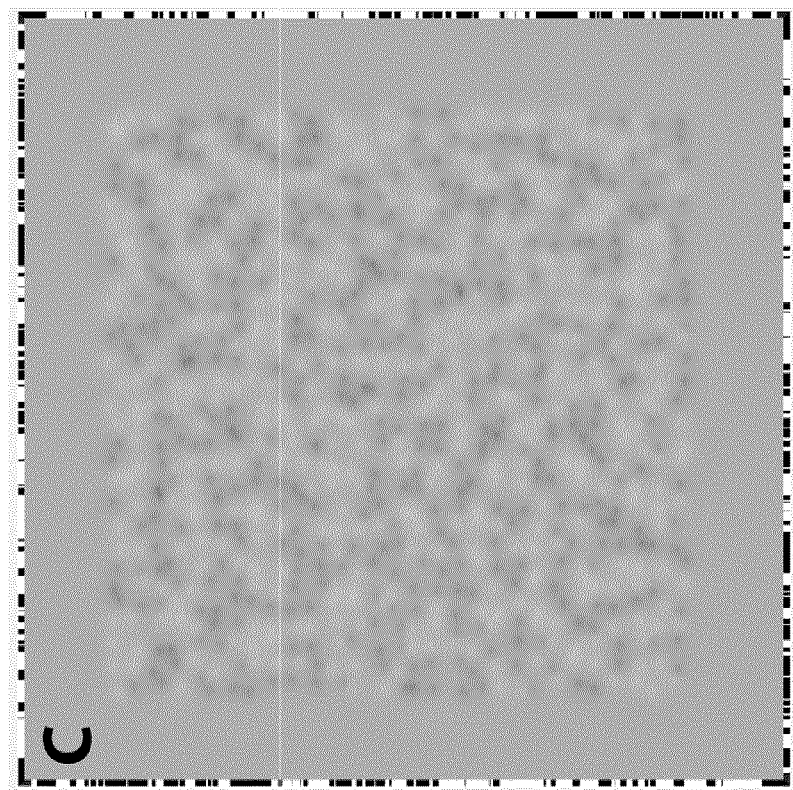

FIGS. 15A-15D illustrate an exemplary visual display in accordance with the present disclosure. The display shown in these figures may be similar to those shown in FIG. 2. Specifically, the visual display may comprise a plurality of dot elements, first arranged on a grid, then offset by a random amount, and finally having a subset offset so as to produce disparity between what is seen by each eye. FIG. 15C illustrates the visual display as it would be shown to a patient on a display device. A patient would view the visual display wearing glasses having a red lens over the left eye and a green or blue lens over the right eye. In some embodiments, different glasses, for example, glasses with differently colored lenses, may be used. FIGS. 15A and 15B illustrate, respectively, what the left and right eye would see individually. FIG. 15D illustrates what would be seen by a patient with stereoscopic vision when they view FIG. 15C with the glasses. Namely, the patient would see a wedge shaped portion of the visual display offset in front of the frame of the display device.

It should be noted from FIGS. 15A-15D that it would be difficult to cheat on such a test. The wedge shaped region which extends from the page when viewed by a patient with stereoscopic vision wearing colored glasses cannot be identified through any other means when viewing FIGS. 15A-15C. Rather, all regions of the visual stimulus appear to contain randomly placed dot elements and differences cannot readily be detected between the left eye stimulus shown in FIG. 15A and the right eye stimulus shown in FIG. 15B.

Some previous stereovision tests presented on digital displays have limited themselves to only presenting stimuli at disparities that can be achieved by shifting the stimulus features by an integer number of pixels (e.g. Hess, To, Zhou, Wang & Cooperstock, 2015. Stereo vision: the haves and have-nots. i-Perception 6, 1-5; Rodriguez-Vallejo, Llorens-Quintana, Montagud, Furlan & Monsoriu, 2016. Fast and reliable stereopsis measurement at multiple distances with iPad. arXiv 1609.06669). This severely limits the range and number of disparities that can be tested. It also means that the disparities that can be tested depend on the properties of the device being used, which is disadvantageous for creating a test that can be run on multiple devices. To produce more precise disparities, it may be desirable to shift the dots 202 by an amount that is not an integer number of pixels. For example, very small disparities may require the dots 202 to be shifted by less than one pixel. To achieve this, sub-pixel interpolation may be used. However, for the hard-edged stimuli used in previous tests this has the side-effect of blurring the dots that are presented in depth. This non-stereo cue may allow the patient to cheat. The design proposed herein avoids this problem in two ways. Firstly, the intrinsic "fuzzy" appearance of our spatially filtered dots 202 makes any slight blur introduced by the sub-pixel interpolation much harder to notice. Secondly, depth may be incorporated into the proposed stimuli by both moving the target wedge 502 forward (crossed disparity) and the background backward (uncrossed disparity) by the same amount. This means that the same degree of interpolation is applied to all dots 202 in the stimulus.

When the stimulus is presented to the subject (at step 104 of FIG. 1), the image that passes through the subject's eye is filtered by the optical transfer function of the subject's eye before the image reaches the subject's retina. This has the effect of blurring any input. The sub-pixel interpolation takes advantage of this, by presenting stimuli that appear (after the optical blur) to be placed between two pixels on the screen. Provided the optical blur is relatively broad compared to the pixel-to-pixel spacing on the display, this allows the presentation of disparities below the screen's resolution limit. It has been found that the interpolation provides a better approximation to an image presented in the desired disparity (that the sub-pixel interpolation is emulating) when applied to the proposed log-Gabor dots 202 than when applied to hard-edged pixel dots.

One skilled in the art will recognize that the types of spatially filtered dot elements described above which have blurred edges may be particularly advantageous for achieving sub-pixel interpolation. The sub-pixel interpolation may allow more minute shifts of the dots 202 to be made, than could be made using hard-edged visual stimuli. In particular, the centers of the spatially filtered dot elements may be able to be moved in sub-pixel increments. Such advantages may be achieved using any type of spatially filtered dot element. In contrast, hard-edged elements may only be movable in increments of pixels, and may thereby be limited by the resolution of the display on which they are shown.

Referring back to FIG. 1, step 104 of presenting the visual stimulus to the subject will now be further described. The visual stimulus may be rendered to any suitable dichoptic viewing arrangement that allows for different images to be shown to the two eyes of the subject. In particular, the visual stimulus may be presented using a display system provided to the subject. For instance, the visual stimulus may be rendered on an electronic device (e.g., on the screen of a desktop computer, portable computer, laptop computer, tablet computer, on a head-mounted display, on a lenticular display, or the like). In some embodiments, the visual stimulus may be viewed using specialized glasses. The electronic device illustratively controls presentation of the stimuli, and more particularly controls the disparity presented to the subject using an adaptive procedure to locate the stereo threshold of the subject. In particular, the device presents the stimulus composed of spatially filtered dot elements in order to reduce the effect of acuity on the obtained stereo threshold. The device then analyses the data obtained from the subject after presentation of the stimulus (step 106 of FIG. 1), using a maximum-likelihood based fitting procedure that also obtains a measure of confidence in the thresholds (the error measurement) that are calculated from the subject's data.

In creating the impression of depth from stereoscopic disparity, different images are shown to the two eyes of the subject at step 104, using a suitable 3D display device and/or system. In one embodiment, this may be achieved by presenting the stimuli at step 104 on a screen associated with a computer, as discussed above. For example, a liquid crystal display (LCD) computer monitor with a 120 Hz refresh rate may be used. The screen may be synchronised through any suitable system, such as the NVIDIA 3D Vision® 2 system, to specialized glasses used by the subject to view the visual stimulus as presented. In one embodiment, wireless shutter glasses are used. It should however be understood that other suitable glasses (e.g., ferroelectric liquid crystal glasses) may apply and that these glasses can be connected to the screen wirelessly or not. By alternating between the left and right eye images on the screen in time with "opening" and "closing" the left and right eyes of the glasses, it is possible to stimulate the subject's eyes separately with stimuli shown on a same screen. Such a stereo vision test may be written using any suitable programming language (such as Matlab/Octave, Python or the like) and the presentation of stimuli on the screen may be controlled using any suitable toolbox (such as Psychtoolbox for Matlab/Octave) or by bespoke software.

In another embodiment, the stereo vision test may be presented on a handheld or portable computing device (e.g., a tablet computer) and the stimulus presentation achieved using red/green anaglyph. The stimuli may be generated in left and right eye versions by removing information from either the red or green colour channels. The two resulting images can then be overlaid using suitable computer software. Viewing with red/green filter 3D glasses worn by the subject then allows for the separate images to be viewed by the two eyes of the subject (with some crosstalk). It should be understood that other embodiments may apply. For example, the stereo vision test may be presented on a lenticular, polarised, or dichroic tablet or using a dichoric projection system.

In yet another embodiment, the stereo vision test may be presented on a head-mounted display. For example, the Oculus Rift virtual reality headset may be used to present the stimuli to the two eyes of the subject at step 104. In this embodiment, specialized glasses would not be needed to view the visual stimulus as presented.

It should be understood that the stereo vision test described herein may be developed using a static stimulus (as described above) or a dynamic stimulus. In the case of a dynamic stimulus, the dots (reference 202 in FIG. 2) would be presented (e.g., on the device's screen) for a random lifespan (e.g., between 100 and 300 milliseconds) before disappearing. Each time a dot 202 disappears, it would be replaced by a new dot 202 appearing at another location (with an appropriate disparity for its location in the stimulus). This dynamic stimulus may include more information than the static stimulus, and may accordingly help subjects perform a given stereo task. Additionally, the dynamic stimulus may reduce the ability of the subject to scrutinize the stimuli for any non-stereo cues to aid identification of the target location. This will further ensure that the measured thresholds only reflect the subject's sensitivity to stereoscopic disparity.

In one embodiment, the stereo task to be performed by the subject is introduced with an additional non-stereo cue to enable subjects with poor stereo to learn how the task works before the test begins. Additional trials with a non-stereo cue may be randomly introduced during testing, which, for instance, motivates children with poor stereo vision to continue attempting to perform the task. There may also be a built-in adjustment for subjects whose eyes are misaligned to bring the stimuli into registration.

The stereo vision test described herein may consist of a sequence of trials where the subject is presented with a stimulus containing a target at one of four locations. In each trial, the subject may be prompted to select which location contains the target, defined by the modulation of the disparity of the dots (reference 202 in FIG. 2). On trials where the subject is not sure of the location of the target, the subject may be instructed to guess. In the desktop computer version of the test (described herein above), the subject may respond by pressing a button on a keypad. For the tablet computer version of the test (described herein above), the subject may be able to tap on the screen at the target location. It should be understood that the test may also be extended to receiving verbal responses (e.g., "top", "bottom", "left", and "right") from the subject.

After responding, the subject is presented with the next stimulus. The disparity of the stimuli may be controlled by a pair of staircase routines that will respond to subject successes by making the stereo task more difficult (smaller disparity) and respond to failures by making the stereo task easier (larger disparities). After each trial, the disparity of the stimulus is recorded, along with whether the target location was successfully identified. This is later used to calculate the disparity at which the subject could reliably identify the target. An online rough estimate of the stereo threshold calculated from staircase reversals (disparities at which the subject transitioned from making incorrect to correct responses, or vice-versa) may also be obtained.

For the first few trials of each testing session, the stimuli may feature an additional cue to the location of the target. The contrast amplitude of the dots 202 in the non-target regions is reduced, so that even without any sensitivity to stereo the target is still apparent. This may be done to help train the subject on how to perform the task that will be required of them in the experiment. As discussed herein above, the trials may also be randomly introduced with additional cues during the testing to keep stereo-blind subjects motivated. The data from these trials may be discarded before any analysis of stereo function is performed.

Each staircase tracks the number of trials that the subject has responded to, as well as the number of reversals (where the task switched from getting easier to getting harder or vice versa). Upon reaching either the maximum number of trials or the maximum number of reversals, the staircase terminates. When both staircases terminate, the main part of the data collection is complete.

It may also be possible to perform a further test of the subject's ability to discriminate between crossed and uncrossed disparity at some factor above threshold (e.g. three times threshold). In this case, wedges in disparity are present at all four target locations (as shown in FIG. 5), with the background dots at a disparity of zero. Three of the wedges are in one direction of disparity (crossed or uncrossed) with a remaining odd-one-out wedge in the other direction. The subject then identifies the odd-one-out. This will test until the subject has reached either a certain number of responses (e.g., 12) or a lesser number of correct responses (e.g., 6). The subject's behaviour can then be converted to a measure of performance on this crossed/uncrossed disparity discrimination task.

Figures 6A, 6B, 6C:
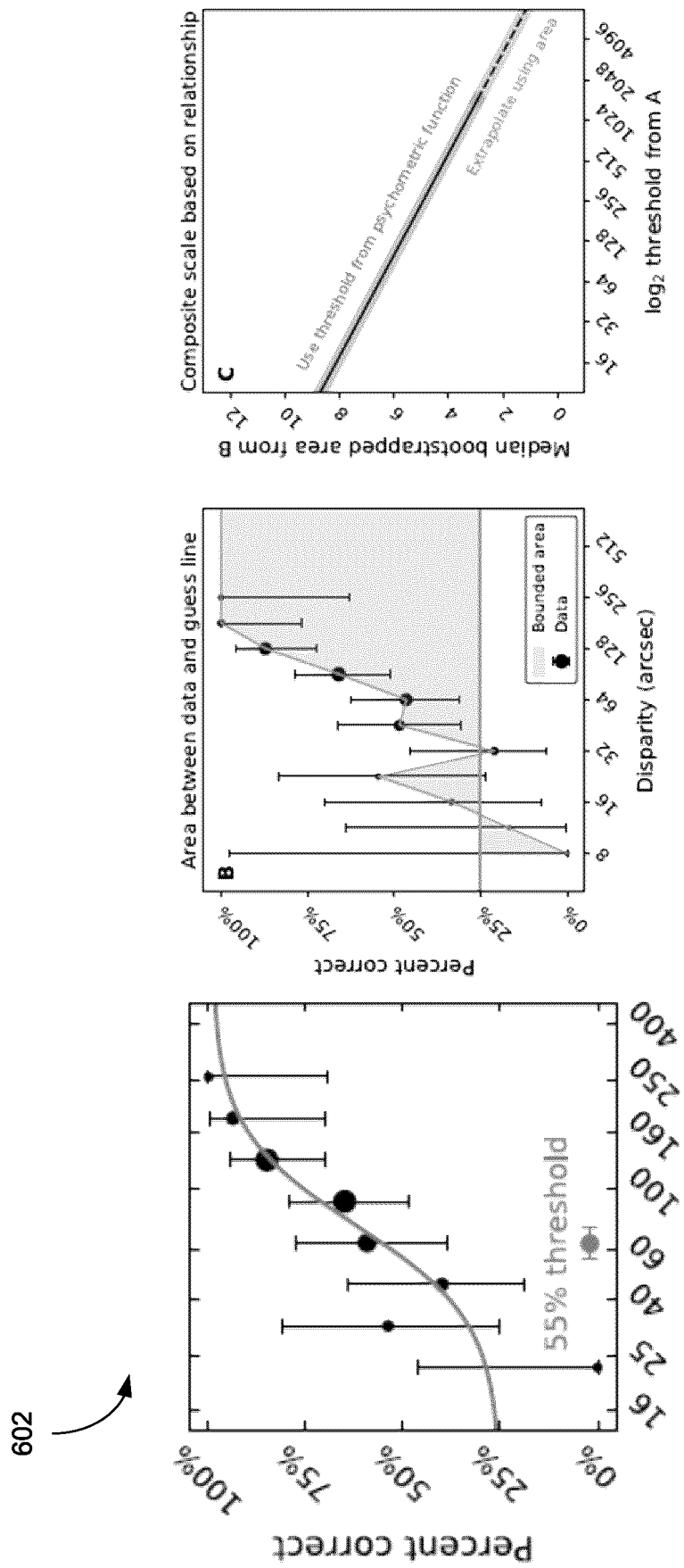
FIGS. 6A-6C a plot of an example psychometric function, a plot of an example extrapolation method, and a plot of an example composite function, respectively, in accordance with an illustrative embodiment.

The data collected during the experiment (at step 106 of FIG. 1) may then be presented in any suitable manner. FIGS. 6A-6C illustrate one method of presenting and analyzing the collected data. In one embodiment, the collected data forms a table with three columns: stimulus disparities (in arc seconds) in a first column, number of trials tested at each disparity in a second column, and number of correct responses at each disparity in a third column. The data may then be fit with a suitable psychometric function (such as a logistic function) 602, as shown in FIG. 6A, using any suitable fitting routine as discussed herein above. The psychometric function 602 fitting outputs an estimate of the subject's disparity threshold. Bootstrapping may also be used to calculate the standard error and confidence intervals of the threshold estimate.

Furthermore, that threshold and error may be used to assess when ordinary analysis has failed and a measure from a more robust secondary analysis should be used instead. This secondary analysis may perform a calculation on the percent-correct scores achieved by the patient at each disparity to give a measure of performance that forms a composite scale with the range of thresholds that can be obtained from psychometric function fitting. With improvement in performance, a patient can transition from that part of the scale to the part where their performance can be characterized by a psychometric function.

In other words, it should be understood that, for some subjects, it may not be possible to successfully constrain the fit of a psychometric function as in 602. In this case, the error associated with the estimate of threshold will be large. However, even in this case, it may be useful to be able to provide some measure of the subject's performance. As discussed above, a robust analysis may be required in such a case.

In some embodiments, a suitably robust measure may be derived by calculating the area between the subject's percent-correct data (with an additional rightmost point extending the polygon horizontally to some arbitrarily high x-value) and the line that represents chance performance (also referred to herein as the 25% "guessing" line). This area can be calculated using trapezoidal integration. FIG. 6B illustrates the robust area-based measurement method. In FIG. 6B, the x-axis may be log 2 transformed before calculating the areas. To prevent outlier points having an undue influence on the area calculation, nonparametric bootstrapping can be performed from the raw trial-by-trial data and the median area calculated from those resampled bootstrap data sets may be used. The calculated area was found to be highly correlated with the fitted psychometric function threshold. The threshold and error from the psychometric function fit may be used to assess when ordinary analysis (such as the logistic function fit) has failed and a measure from a more robust analysis should be used instead. One skilled in the art will recognize that the trapezoidal integration method illustrated by FIG. 6B is merely an exemplary extrapolation method. Other methods may be used to analyze the data to which a function cannot be fit without departing from the scope of the present disclosure.

Furthermore, this secondary measure may be utilised to create a composite performance scale (or composite performance axis). That scale may have a first part corresponding to the thresholds estimated from the psychometric function as in 602 (up to a given maximum) and a second part where the scale extends to include values from a more robust analysis. FIG. 6C illustrates this composite scale, in which a first portion gives the levels of performance that can be measured through fitting a psychometric function. The second portion of the scale extrapolates the threshold values, with the location of the subject on that part of the scale determined using the bounded area method. With improvement in performance, a patient can transition from that part of the scale to the part where their performance can be characterized by a psychometric function.

In one embodiment, the overall outcome of the analysis of the subject data (as performed at step 106 of FIG. 1 and as discussed herein above) may therefore consist of the following: (1) a graph of the psychometric function as in 602, allowing the person administering the test to get a view of the subject's performance; (2) an estimate of the threshold for detecting stereoscopic disparity, with the associated standard error and confidence intervals; (3) a measure derived from the area between the subject's data points and the 25% guessing line, used as a backup indicator of stereo performance in subjects whose data could not be fitted; and (4) a score on the direction-of-depth discrimination task, the score being between 6/6 (i.e. a perfect score) and 0/12 (i.e. a score below chance, which would be 3/12).

One skilled in the art will recognize that the method illustrated in FIGS. 6A-6C and described above may be used with any type of test for stereo vision. Namely, data may be collected at different disparity levels, indicating the performance of the patient at each level. The data may then be fit with a logistic psychometric function 602, as shown in FIG. 6, using any suitable fitting routine as discussed herein above. The collected data may come from a stereo vision test discussed herein or from any other type of stereo vision test known in the art. Such analysis may allow more accurate data to be collected from patients using new and traditional testing methods.

The systems and methods described herein may be further extended to make measurements of stereo ability at different locations in the visual field. This could serve as a diagnostic tool for diseases which cause a local loss in sensitivity to disparity. For example, conditions affecting the retina of one eye would prevent a subject from being able to use disparity information at the affected location. This may allow deformations of the retina to be identified at an earlier stage than would be possible otherwise.

As discussed above, the present disclosure measures the ability of a patient to detect depth from disparity in images. The perception of depth from disparity requires compatible inputs from corresponding regions of the retina in the two eyes. Where a disease of the retina deteriorates the quality of the output of one eye (or otherwise causes it to no longer correspond to the output of the other eye), this will impair stereoacuity at the location of the deterioration. Examples of diseases that could degrade the retina in this way include macular degeneration, glaucoma and diabetic retinopathy. Proper treatment of these diseases is helped both by early detection and by the ability to monitor disease progression. In current clinical practise, the health of different regions of the visual field can be assessed in a variety of ways. These include the Amsler grid, where a square grid is presented to the patient and they are asked to report any abnormalities in its appearance. Preferential Hyperacuity Perimetry works on a similar principle; the patient is presented with a row of dots and asked to indicate any deviations from a straight line. Both of these tests rely on the patient's subjective report of their visual perception. There are also visual field tests in which a patient is presented with targets (flashing lights or other luminance-contrast stimuli) at different locations in their visual field and scored on their ability to detect targets at each location. These tests will not identify cases where the percept is visible, but distorted or where the later brain areas "perceptually fills-in" the distorted or unresponsive region. Furthermore, each eye must be tested separately.

Methods according to the present disclosure use sensitivity to binocular disparity to identify regions of the visual field where stereoacuity is significantly worse than expected in normal healthy binocular vision. This may indicate that a retinal abnormality in one or both eyes is affecting vision at that location. Because the positional shifts that result in the perception of depth can be very small, our test should be sensitive to relatively minor retinal changes that interfere with these shifts. The present methods are based on an optimal algorithm for testing areas of interest in the visual field in a short amount of time. The test also has the advantage that both eyes are tested simultaneously, further reducing time needed to identify whether a patient requires further screening. The map obtained of sensitivity across the visual field does not rely on the patient's reporting where they see an anomalous percept. Instead it is a more objective test of their ability to see stereoscopic disparity at each location.

Testing of stereo ability across the visual field may be conducted at a single disparity, after establishing that the subject is able to reliably detect that disparity in the original test. In one embodiment, the targets may be discs presented at ten locations around a fixation point. On each trial, the subject may be shown between one and four discs. The subject may respond with the number of discs that they see. An entropy-minimising algorithm may then work out which discs the subject consistently fails to count on a trial-by-trial basis. This allows the program to focus on those locations (i.e. locations where there is a suspected defect) for further testing.

In some embodiments, the systems and methods which measure stereo ability at different locations may be used to measure macular degeneration, diabetic retinopathy, or other conditions that cause asymmetric degeneration of the eyes.

In some embodiments, testing across the visual field may be conducted at multiple disparities. For example, the entire testing method using discs described above may be performed at multiple disparities. Such testing may determine the disparity which a patient is capable of recognizing at each location in the visual field. Accordingly, it may allow a map of the stereo ability of the eyes to be made. This map may allow areas of weakness where degeneration is likely to have occurred to be identified. In some embodiments, testing across the visual field may be conducted at a single disparity. Such testing may involve other variations, for example in the size of the targets or the duration of time for which the targets are displayed. These tests may also enable thresholds of capability at different regions to be established. Accordingly, the present systems and methods may not only allow areas of weakness/strength to be identified, but may also enable that weakness/strength to be measured for different areas across the visual field of the eye.

In some embodiments, the tests may identify an area at which the eyes have different strengths. This may indicate that one eye is damaged/injured/degenerated at that location. The test may indicate which eye is degenerated or other imaging or testing procedures may be used to determine which eye is degenerated.

Figure 7:
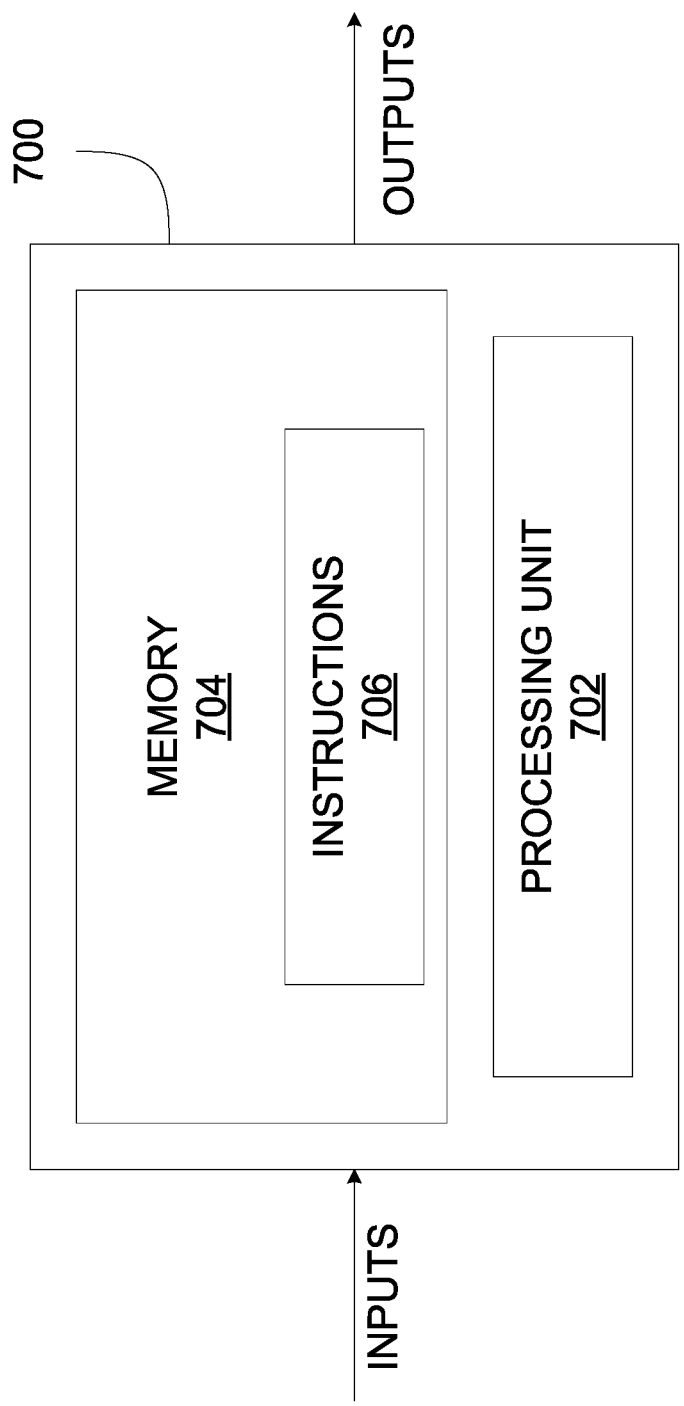
FIG. 7 is a schematic diagram of an example computing system for implementing the method of FIG. 1, in accordance with an illustrative embodiment.

FIG. 7 is an example embodiment of a computing device 700 for implementing the method 100 described above with reference to FIG. 1. The computing device 700 comprises a processing unit 702 and a memory 704 which has stored therein computer-executable instructions 706. The processing unit 702 may comprise any suitable devices configured to cause a series of steps to be performed such that instructions 706, when executed by the computing device 700 or other programmable apparatus, may cause the functions/acts/steps specified in the method described herein to be executed. The processing unit 702 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

Figure 14:
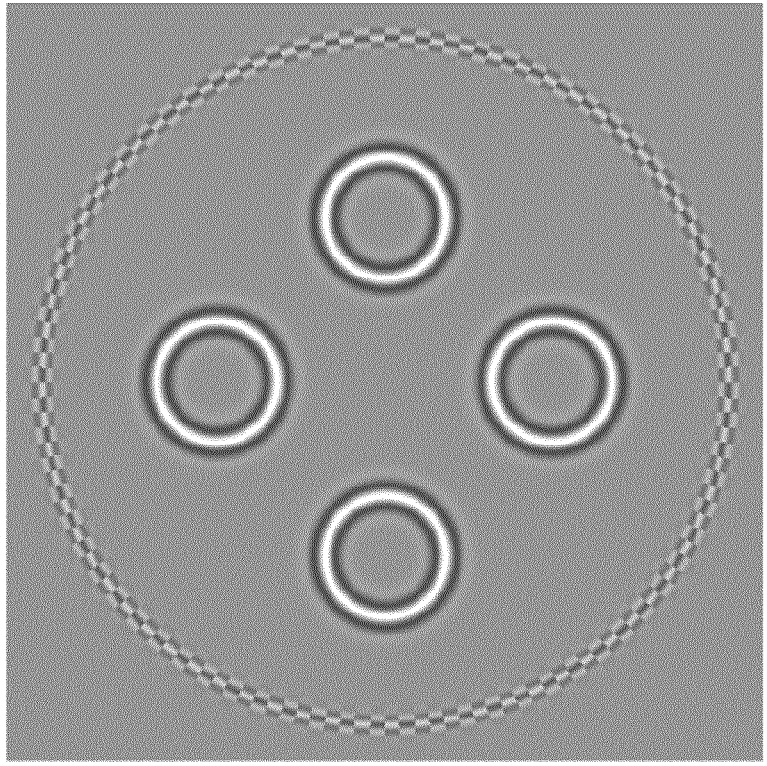
FIG. 14 is a proposed design for a visual stimulus in accordance with the present disclosure.
Figure 14:
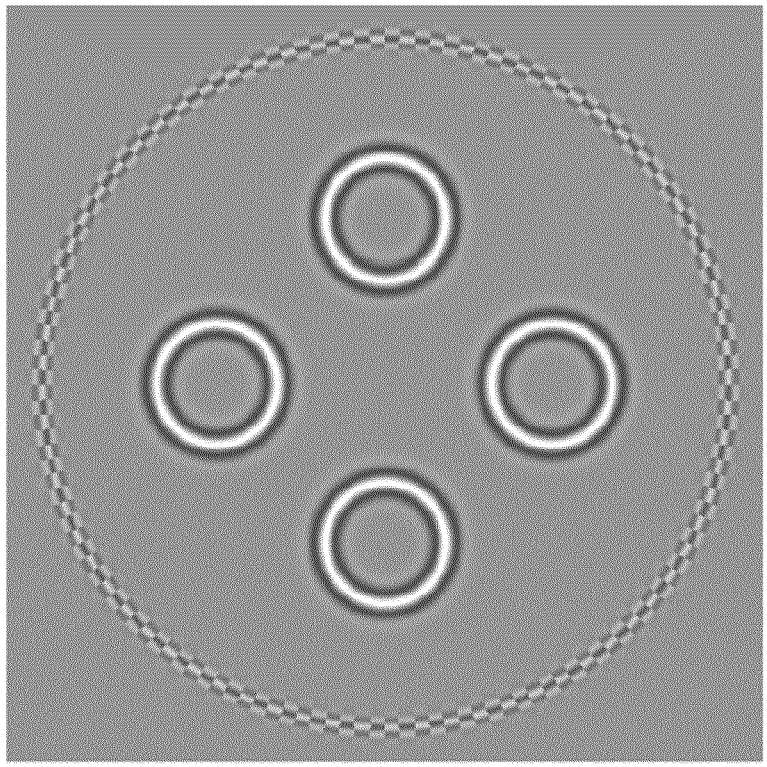

FIG. 14 illustrates an alternative embodiment of a visual stimulus, which may use any of the shapes disclosed above. In particular, this visual stimulus may use ring dots or arbitrary shape dots, such as those illustrated in FIGS. 11-12.

Ring dots such as those described in FIGS. 11A-11B may be used in a variation of the stereo test. In the variant stimuli test, the subject may be presented with four rings using a dichoptic presentation illustrated in FIG. 14. The "left eye image" may be presented to the left eye and the "right eye image" may be presented to the right eye. This may be done by using two screens, by using specialized glasses as described above, or by using any other means known in the art. The positions of the rings may be shifted in order to present them in stereoscopic disparity. Both images may include a patterned ring surrounding the stimuli rings, which may be set at zero disparity. The patterned ring may define a reference plane. The patient viewing the rings may be tasked with detecting which ring is in a different depth plane form the other rings. In the exemplary embodiment shown in FIG. 14, the left-most ring may be the target. Arbitrarily shaped dots such as those illustrated in FIGS. 12A-12C may also be used with this stereo test.

This stereo test may be used to investigate questions which are difficult to investigate using the dots described above. For example, the ring dots can be generated on a smaller screen than is needed for the random dot stereo test. Also, the correspondence between the rings seen by the two eyes may be less ambiguous than is the case for random dot stimuli. The measurement procedure, such as staircase routines, and the analysis, such as fitting and bootstrapping to get confidence intervals, may be similar to that used on the version with random dots.

The methods and systems discussed above may present a number of advantages. In particular, they may prevent cheating in stereo vision tests. As discussed above, the random dot tests may include a plurality of dots which are largely the same between the two eyes, but which include a small percentage of dots which are shifted. Further, the dots may have blurred edges. Similarly, the rings described above have fuzzy edges and luminance which averages to zero. Accordingly, in both the random dot test and the ring test, it may be difficult for a patient to recognize the target answer through means other than stereo vision. Therefore, patients who do not have stereo vision will answer incorrectly while patients who do have stereo vision will answer correctly. This may prevent the test from returning false negatives or false positives and make it more accurate. It may also make the tests more valuable for telemedicine or screening applications, where a medical professional or other operator is not supervising the testing. This may widen the pool of patients for whom the tests can be used.

Further, the methods and systems disclosed herein may be more suitable for patients with low visual acuity than traditional systems and methods. As shown in FIGS. 4A-4F, a patient with low visual acuity experience less deficiency when looking at an image of spatially filtered dots than when looking at an image of hard-edged dots. Because the edges of the spatially filtered dots are already blurred, the patient is not disadvantaged by the loss of high-frequency information. This may allow them to be used with patients with low visual acuity without having to correct or compensate for the low visual acuity. This may broaden the potential patients for whom the systems and methods may be used and/or allow them to be used without additional steps to correct visual acuity. The bandpass nature of the dots further opens up the possibility of testing at a range of "peak" spatial frequencies in order to assess stereovision at different spatial scales.

Further, the methods and systems disclosed herein may allow elements of the visual stimuli to be moved by subpixel increments. This may allow for more accurate measurements of stereo function to be made. In particular, it may allow for the point at which a patient transitions from being able to see stereoscopically to not being able to see stereoscopically to be identified. The analysis methods disclosed herein may further allow such precise measurements to be made in a variety of circumstances, using a variety of tests.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. A non-transitory computer-readable medium storing one or more programs configured to be executed by one or more processors of a system for stereo vision measurement, the one or more programs including instructions for:
   defining a spatial frequency range to be tested as a central frequency or range of frequencies, and configuring a bandpass filter to attenuate stimulus energy both at high spatial frequencies above the spatial frequency range and low spatial frequencies below the spatial frequency range;
   providing a three-dimensional visual stimulus, the stimulus composed of a plurality of spatially bandpass filtered elements configured to measure a user's stereopsis ability separate from a visual acuity ability thereof, the plurality of spatially bandpass filtered elements being filtered using the bandpass filter;
   presenting, via a display device, the three-dimensional visual stimulus to a user;
   receiving input data in response to the user viewing the three-dimensional visual stimulus as presented; and
   determining a stereopsis ability performance of the user from the input data,
   wherein the plurality of spatially bandpass filtered elements includes one or more of: isotropic log-Gabor dot elements, difference of Gaussians dot elements, ring dot elements, a convolution of a spatial filter and an image object, and elements of at least two shades.

2. The non-transitory computer-readable medium of claim 1, wherein providing the three-dimensional visual stimulus comprises one or more of:
   generating the three-dimensional visual stimulus; and
   retrieving from said medium the three-dimensional visual stimulus.

3. The non-transitory computer-readable medium of claim 1, wherein providing the three-dimensional visual stimulus includes generating the three-dimensional visual stimulus by placing the plurality of spatially bandpass filtered elements on a grid and then offsetting each of the spatially bandpass filtered elements of the plurality of spatially bandpass filtered elements by a random amount.

4. The non-transitory computer-readable medium of claim 3, wherein one or more spatially bandpass filtered elements of the plurality of spatially bandpass filtered elements has a center offset from a pixel of the display device in order to present that element at a subpixel disparity.

5. The non-transitory computer-readable medium of claim 1, wherein a portion of the plurality of spatially bandpass filtered elements appear in a first location for a first eye and in a second location for a second eye and the portion are located in a single region of the three-dimensional visual stimulus.

6. The non-transitory computer-readable medium of claim 1, wherein one or more of the plurality of spatially bandpass filtered elements appears offset from two or more of the plurality of spatially bandpass filtered elements from a user perspective.

7. The non-transitory computer-readable medium of claim 1, wherein providing the three-dimensional visual stimulus includes generating by:
   disposing a plurality of placeholder dots on a grid;
   moving each of the plurality of placeholder dots by a random amount; and
   convolving the plurality of placeholder dots with a function to produce the plurality of spatially bandpass filtered elements.

8. The non-transitory computer-readable medium of claim 1, the one or more programs further including instructions for:
   repeating the steps of providing the three-dimensional visual stimulus, all of the three-dimensional visual stimuli having a first disparity; presenting the three-dimensional visual stimulus to the user; receiving the input data; and determining the stereopsis ability performance of the user.

9. The non-transitory computer-readable medium of claim 8, wherein all of the three-dimensional visual stimuli having at least one disparity different from the first disparity.

10. The non-transitory computer-readable medium of claim 9, the one or more programs further including instructions for:
    recording the stereopsis ability performance of the user at each disparity and fitting a logistic psychometric function to a plot of the disparity versus the performance at each disparity.

11. The non-transitory computer-readable medium of claim 10, the one or more programs further including instructions for:
    identifying a threshold at which a patient is capable of stereoscopic vision based on the logistic psychometric function and estimating an associated error through bootstrapping.

12. A computer-implemented method for stereo vision measurement, the method comprising, implemented using a computing device that includes a processing unit and a memory communicatively coupled to the processing unit:
  defining a spatial frequency range to be tested as a central frequency or range of frequencies, and configuring a bandpass filter to attenuate stimulus energy both at high spatial frequencies above the spatial frequency range and low spatial frequencies below the spatial frequency range;
  providing a three-dimensional visual stimulus, the stimulus composed of a plurality of spatially bandpass filtered elements configured to measure a user's stereopsis ability separate from a visual acuity ability thereof, the plurality of spatially bandpass filtered elements being filtered using the bandpass filter;
  presenting, via a display device, the three-dimensional visual stimulus to a user;
  receiving input data in response to the user viewing the three-dimensional visual stimulus as presented; and
  determining a stereopsis ability performance of the user from the input data,
  wherein the plurality of spatially bandpass filtered elements include one or more of: isotropic log-Gabor dot elements, difference of Gaussians dot elements, ring dot elements, a convolution of a spatial filter and an image object, and elements of at least two shades.

13. A system for stereo vision measurement that includes:
  a processing unit;
  a memory; and
  one or more programs, wherein the one or more programs are stored in the memory and configured to be executed by the processing unit, the one or more programs including instructions for:
    defining a spatial frequency range to be tested as a central frequency or range of frequencies, and configuring a bandpass filter to attenuate stimulus energy both at a high spatial frequency above the spatial frequency range and low spatial frequency below the spatial frequency range;
    providing a three-dimensional visual stimulus, the stimulus composed of a plurality of spatially bandpass filtered elements configured to measure a user's stereopsis ability separate from a visual acuity ability thereof, the plurality of spatially bandpass filtered elements being filtered using the bandpass filter;
    presenting, via a display device, the three-dimensional visual stimulus to a user;
    receiving input data in response to the user viewing the three-dimensional visual stimulus as presented; and
    determining a stereopsis ability performance of the user from the input data,
    wherein the plurality of spatially bandpass filtered elements include one or more of: isotropic log-Gabor dot elements, difference of Gaussians dot elements, ring dot elements, a convolution of a spatial filter and an image object, and elements of at least two shades.

* * * * *